United States Patent
Abraham et al.

(10) Patent No.: US 12,302,864 B2
(45) Date of Patent: May 20, 2025

(54) COLLAR DEVICES, SYSTEMS, AND METHODS FOR ANIMAL MONITORING

(71) Applicant: PetPace LTD., Shefayim (IL)

(72) Inventors: Lior Abraham, Shefayim (IL); Asaf Dagan, Shefayim (IL); Oren Elimelech, Shefayim (IL)

(73) Assignee: PETPACE LTD., Shefayim (IL)

( * ) Notice: Subject to any disclaimer, the term of this patent is extended or adjusted under 35 U.S.C. 154(b) by 162 days.

(21) Appl. No.: 17/873,206

(22) Filed: Jul. 26, 2022

(65) Prior Publication Data

US 2024/0032510 A1 Feb. 1, 2024

(51) Int. Cl.
*A01K 27/00* (2006.01)

(52) U.S. Cl.
CPC .......... *A01K 27/001* (2013.01); *A01K 27/009* (2013.01)

(58) Field of Classification Search
CPC .. A01K 27/001; A01K 27/009; A01K 15/022; A01K 29/005; A01K 29/001
See application file for complete search history.

(56) References Cited

U.S. PATENT DOCUMENTS

| | | | | |
|---|---|---|---|---|
| 11,399,513 | B1* | 8/2022 | Dana | A01K 29/005 |
| 2007/0270671 | A1* | 11/2007 | Gal | A61B 5/7214 |
| | | | | 600/301 |
| 2010/0324861 | A1* | 12/2010 | Goulding | G06F 18/00 |
| | | | | 702/150 |
| 2011/0061605 | A1* | 3/2011 | Hardi | A01K 27/009 |
| | | | | 340/573.3 |
| 2013/0014706 | A1* | 1/2013 | Menkes | A61B 7/04 |
| | | | | 119/859 |
| 2014/0196673 | A1* | 7/2014 | Menkes | A61B 5/0205 |
| | | | | 119/859 |
| 2016/0174099 | A1* | 6/2016 | Goldfain | A61B 5/6831 |
| | | | | 375/130 |
| 2018/0153137 | A1* | 6/2018 | Goetzl | A01K 27/001 |
| 2019/0261599 | A1* | 8/2019 | Bedell | A01K 15/023 |
| 2020/0267941 | A1* | 8/2020 | Seltzer | A01K 27/009 |
| 2020/0404886 | A1* | 12/2020 | Gibbs | A01K 27/009 |
| 2021/0059220 | A1* | 3/2021 | Costigan | G06V 40/23 |
| 2021/0219523 | A1* | 7/2021 | So | A01K 27/001 |
| 2022/0061260 | A1* | 3/2022 | Gross | A01K 1/0023 |
| 2022/0151207 | A1* | 5/2022 | Mott | A01K 29/005 |
| 2024/0185988 | A1* | 6/2024 | Carson | A61D 99/00 |

* cited by examiner

*Primary Examiner* — Joshua J Michener
*Assistant Examiner* — Nicole Paige Maccrate
(74) *Attorney, Agent, or Firm* — Rivka Friedman

(57) ABSTRACT

A collar has a band having oppositely disposed first and second surfaces. Acoustic concentrators project from the first surface in a projection direction and are configured to penetrate fur in a portion of an animal to place the band in communication with the animal. Acoustic sensors functionally associated with the acoustic concentrators are configured to measure at least one first bioparameter by detecting vibrations corresponding to the at least one first bioparameter, and generate signals representing the at least one first bioparameter. Non-acoustic sensors are associated with the band and are configured to measure one or more second bioparameters associated with the animal, and generate signals representing the one or more second bioparameters. AGC circuitry adjusts signal gain of the signals representing the at least one first bioparameter. A processing subsystem determines a condition of the animal based at least in part by processing signals received from the AGC circuitry.

16 Claims, 6 Drawing Sheets

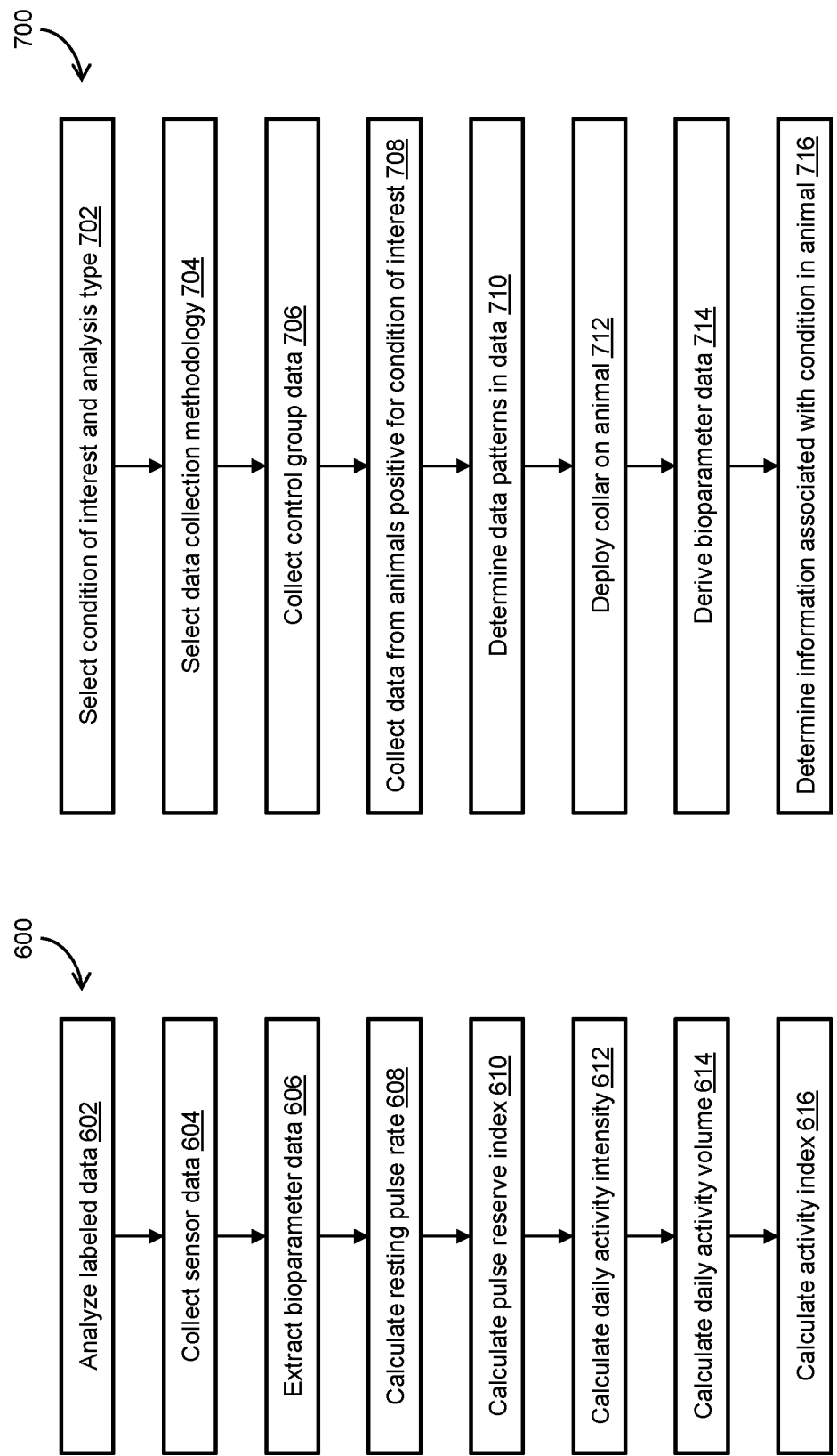

COLLAR DEVICES, SYSTEMS, AND METHODS FOR ANIMAL MONITORING

TECHNICAL FIELD

The present invention relates to monitoring animals, and in particular monitoring animal bioparameters and vital signs using a specially designed collar device.

BACKGROUND OF THE INVENTION

Animals that are sick or have an adverse medical condition may tend, by nature, to withdraw and hide due to feeling defenseless. This behavior makes diagnosis/detection of diseases and conditions and the subsequent treatment of the animal significantly more difficult. In many animals, for example pet animals such as dogs and cats, it is standard medical practice to check the vital signs of a sick animal. However, this tends to occur long after the animal has contracted the medical condition, typically because the animal was concealing symptoms and/or because it takes time for the animal to reach the veterinarian. Often, early diagnosis and detection is not achieved, but is critical in order to reduce suffering in the animal and reduce the likelihood of a severe disease, which may develop if detection occurs late.

SUMMARY OF THE INVENTION

Aspects of the present invention provide an animal collar device and system for monitoring health and behavior of animals, and methods for monitoring health and behavior of animals using such animal collar and system. The animal collar device includes a band having associated therewith a sensor arrangement that includes at least one sensor, and preferably a plurality of sensors, each of which is operative to collect sensor data by way of detection/measurement of bioparameters associated with the animal. In preferred embodiments, the plurality of sensors includes one or more acoustic sensors that have a piezoelectric element embedded in regions of the band, and one or more non-acoustic sensors such as temperature sensors and motion-type sensors (e.g., accelerometers, gyroscopes). The acoustic sensors detect/measure vibration-related bioparameters, and a processing subsystem processes bioparameter data to detect or monitor vital signs such as breathing rate, heart rate, and heart rate variability. Preferably the processing subsystem processes bioparameter sensor data from the non-acoustic sensors to detect or monitor other animal-related features such as activity, position, posture, orientation, and the like. Preferably one or more sets of acoustic concentrators are located on regions of the band near the piezoelectric elements and project in a direction from an inner surface of the band toward the animal in order to convey vibrations from the animal to the piezoelectric elements. An electronics assembly may be retained within a housing that may be integrally formed with the band. The processing subsystem may send alerts or notifications to user communication devices that are in networked communication with the collar device.

Certain preferred embodiments according to an aspect of the present invention provide automatic gain control circuitry as part of the electronics assembly, which provides automatic switching between a plurality of gain values, and/or live feedback automatic gain adjustment, to maintain the amplitude of acoustic signals within a specified range. Preferably, the automatic gain control circuitry checks the amplitude and the saturation percentage of the acoustic signals and uses sensor data from at least one of the non-acoustic sensors to make automatic adjustments to the acoustic signal gain.

In certain preferred embodiments according to another aspect of the present invention, the mechanical properties of the band are such that the band is biased inward, whereby the regions of the band at which the acoustic concentrators are located are biased inward toward a central axis of the band which preferably passes through the housing.

Certain preferred embodiments according to a further aspect of the present invention provide an animal monitoring method using the collar device and/or system according to embodiments of the present invention. The processing subsystem processes signals associated with signals generated by the sensor arrangement to derive bioparameter data, and the bioparameter data is processed together with generated data patterns corresponding to a control group of animals and a group of animals having a condition of interest.

In certain preferred embodiments according to an aspect of the present invention, the processing subsystem analyzes sensor data from one or more of the sensors of the sensor arrangement, preferably temperature sensors of the sensor arrangement, to determine whether or not the collar and/or the band is properly positioned on (e.g., wrapped around) a portion (e.g., neck) of the animal.

Certain preferred embodiments according to another aspect of the present invention provide a location module, which can be part of the electronics assembly, that provides location data that is indicative of a location of the collar device. The processing subsystem preferably processes the location data together with sensor data from one or more of the sensors of the sensor arrangement to produce correlated data that includes a correlation between the location of the band and bioparameters of the animal and/or vital signs of the animal and/or activity of the animal and/or movement of the animal and/or posture of the animal.

It is noted that the present invention may include additional aspects other than those explicitly mentioned above. It is further noted that the various aspects of the present invention presented herein are of independent utility and are each patentable in their own right. Nevertheless, there is believed to be a particular synergy which exists when these aspects are combined into a single embodiment.

According to the teachings of an embodiment of the present invention, there is provided a system for monitoring an animal. The system comprises: a collar including: a band having a first surface for communicating with a portion of the animal and a second surface oppositely disposed from the first surface, at least one acoustic concentrator projecting from the first surface in a projection direction and configured to penetrate fur in the portion of the animal so as to place the band in communication with the portion of the animal, a sensor arrangement including: at least one acoustic sensor functionally associated with the at least one acoustic concentrator and having at least a component thereof embedded in the band, the at least one acoustic sensor operative to: i) measure at least one first bioparameter by detecting vibrations corresponding to the at least one first bioparameter, and ii) generate signals representing the at least one first bioparameter, and one or more non-acoustic sensors associated with the band and operative to: i) measure one or more second bioparameters associated with the animal, and ii) generate signals representing the one or more second bioparameters, and automatic gain control (AGC) circuitry in signal communication with the sensor arrangement and operative to adjust signal gain of the signals representing the at least one first bioparameter; and a processing subsystem associated with the AGC circuitry configured to determine a condition of the animal based at least in part by processing signals received from the AGC circuitry.

Optionally, the AGC circuitry is functionally associated with at least one of the one or more non-acoustic sensors and is configured to adjust the signal gain of the signals representing the at least one first bioparameter based at least in part on the signals representing the one or more second bioparameters measured by the at least one of the one or more non-acoustic sensors.

Optionally, the processing subsystem is configured to determine the condition of the animal based further in part by processing signals received from the sensor arrangement including the signals representing the at least one second bioparameter.

Optionally, the at least one acoustic sensor includes at least one piezoelectric element embedded in at least one region of the band associated with the at least one acoustic concentrator, and the at least one region is biased toward a central axis of the band along the projection direction such that the at least one acoustic concentrator penetrates fur in the portion of the animal without necessitating engaging the collar when the band is positioned on the portion of the animal.

Optionally, the system further comprises: a housing containing at least the AGC circuitry, the housing located in a central region of the band and being dimensioned so as to bias the at least one region.

Optionally, the at least one first bioparameter includes respiration rate and pulse rate.

Optionally, the one or more second bioparameters associated with the animal includes at least one of: skin or surface temperature of the animal, temperature of an immediate environment surrounding the animal, movement of the animal, and posture of the animal.

Optionally, the one or more non-acoustic sensors includes at least a first temperature sensor that produces a first signal corresponding to a first temperature measurement and a second temperature sensor that produces a second signal corresponding to a second temperature measurement, the first temperature sensor located on a central region of the band and in association with the first surface of the band, and the second temperature sensor located on or near the central region of the band and in association with the second surface of the band.

Optionally, the one or more non-acoustic sensors includes at least one of an accelerometer or a gyroscope.

Optionally, the processing subsystem is further configured to process signals associated with signals generated by the sensor arrangement to produce a metric indicative of whether the band is positioned on the portion of the animal.

Optionally, the one or more non-acoustic sensors includes at least a first temperature sensor that produces a first signal corresponding to a first temperature measurement and a second temperature sensor that produces a second signal corresponding to a second temperature measurement, the first temperature sensor located on a central region of the band and in association with the first surface of the band, and the second temperature sensor located on or near the central region of the band and in association with the second surface of the band, and the processing subsystem produces the metric at least in part by processing the first and second signals to compare the first and second temperature measurements.

Optionally, the system further comprises: a location module deployed in association with the band that provides location data indicative of a location of the band, and the processing subsystem is further configured to process signals associated with signals generated by the sensor arrangement together with the location data so as to produce correlated data that includes a correlation between location of the band and one or more of: vital signs of the animal, activity of the animal, movement of the animal, and posture of the animal.

Optionally, the location module includes one or more of: a global positioning system (GPS) receiver, a wireless communication transceiver, and a cellular communication transceiver.

Optionally, the processing subsystem is further configured to determine information associated with a condition of interest by processing signals associated with signals generated by the sensor arrangement together with data patterns derived from data collected from a control group of animals and data collected from a group of animals having the condition of interest.

Optionally, regions of the second surface that are at least partially behind the at least one acoustic concentrator are smooth regions.

Optionally, the collar further includes at least one of: i) at least one acoustic balancer projecting from the second surface and located at one or more regions of the second surface at least partially behind the at least one acoustic concentrator, the at least one acoustic balancer operative to reduce noise in vibrations conveyed by the at least one acoustic concentrator to the at least one acoustic sensor, or ii) a layer of compression resistive and energy absorptive material embedded in the band and located between the at least one acoustic sensor and the second surface of the band, the layer of compression resistive and energy absorptive material operative to reduce noise in vibrations conveyed by the at least one acoustic concentrator to the at least one acoustic sensor.

There is also provided according to an embodiment of the teachings of the present invention a collar for monitoring an animal. The collar comprises: a band having a first surface for communicating with a portion of the animal and a second surface oppositely disposed from the first surface; at least one acoustic concentrator projecting from the first surface in a projection direction and configured to penetrate fur in the portion of the animal so as to place the band in communication with the portion of the animal; and a sensor arrangement including: at least one acoustic sensor functionally associated with the at least one acoustic concentrator and including at least one piezoelectric element embedded in at least one region of the band associated with the at least one acoustic concentrator, the at least one acoustic sensor operative to: i) measure at least one first bioparameter by detecting vibrations corresponding to the at least one first bioparameter, and ii) generate signals representing the at least one first bioparameter, and one or more non-acoustic sensors associated with the band and operative to: i) measure one or more second bioparameters associated with the animal, and ii) generate signals representing the one or more second bioparameters, and the first surface has a contour such that the at least one region of the band is biased toward a central axis of band along the projection direction such that the at least one acoustic concentrator penetrates the fur in the portion of the animal without necessitating engaging the band when the band is positioned on the portion of the animal.

Optionally, the collar further comprises: a housing having at least one of the one or more non-acoustic sensors retained therein or mounted thereto, the housing located in a central region of the band and being dimensioned so as to provide the contour of the first surface and bias the at least one region.

There is also provided according to an embodiment of the teachings of the present invention a method for monitoring an animal. The method comprises: collecting first data from a control group of animals and collecting second data from a group of animals having a condition of interest; applying a machine learning model to the collected first and second data to determine first data patterns associated with the first data and second data patterns associated with the second data; deploying a collar around a portion of the animal, the collar including: a band having a first surface for communicating with the portion of the animal and a second surface oppositely disposed from the first surface, at least one acoustic concentrator projecting from the first surface in a projection direction and configured to penetrate fur in the portion of the animal so as to place the band in communication with the portion of the animal, and a sensor arrangement having: at least one acoustic sensor functionally associated with the at least one acoustic concentrator and having at least a component thereof embedded in the band, the at least one acoustic sensor operative to measure at least one first bioparameter by detecting vibrations corresponding to the at least one first bioparameter and generate signals representing the at least one first bioparameter, and one or more non-acoustic sensors associated with the band and operative to measure one or more second bioparameters associated with the animal and generate signals corresponding to the measured one or more second bioparameters; processing signals associated with signals generated by the sensor arrangement to derive bioparameter data for the at least one first bioparameter and for the one or more second bioparameters; and processing the bioparameter data together with the first and second data patterns according to an algorithm based on the machine learning model to determine information associated with the condition of interest in the animal.

Optionally, the collar further includes automatic gain control (AGC) circuitry in signal communication with the sensor arrangement and operative to adjust signal gain of at least the signals representing the at least one first bioparameter, and the processing signals associated with signals generated by the sensor arrangement to derive bioparameter data for the at least one first bioparameter includes processing signals received from the AGC circuitry.

Optionally, the at least one acoustic sensor includes at least one piezoelectric element embedded in at least one region of the band associated with the at least one acoustic concentrator, and the at least one region is biased toward a central axis of the band along the projection direction whereby deploying the collar around the portion of the animal is such that the at least one acoustic concentrator penetrates the fur in the portion of the animal without necessitating engaging the collar when the band is positioned on the portion of the animal.

Optionally, the method further comprises: processing signals associated with signals generated by the sensor arrangement to produce a metric indicative of whether the band is positioned on the portion of the animal.

Optionally, the collar further includes a location module deployed in association with the band that provides location data indicative of a location of the band, and the method further comprises: processing signals associated with signals generated by the sensor arrangement together with the location data so as to produce correlated data that includes a correlation between location of the band and one or more of: vital signs of the animal, activity of the animal, movement of the animal, and posture of the animal.

Within the context of this document, the term "animal" refers to any non-human animal, and includes, but is not limited to pet animals (such as dogs and cats), farm animals, work animals, zoo animals, exotic animals, and the like.

Within the context of the present document, the term "fur" generally refers to any growth of hair that covers the skin of an animal. Thus, the term "fur" as used herein encompasses all terms that generally refer to animal hair, including, but not limited to, traditional fur (for example as applied within the context of dogs, cats, rabbits, etc.), hair (for example as applied within the context of bovines, e.g., cattle), coat (for example as applied within the context of quines, e.g., horses), and wool (for example as applied within the context of sheep).

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 6 is a flow diagram illustrating a process using an animal collar device and system of embodiments of the present invention, for assigning a fitness index or score to an animal the animal collar device, according to embodiments of the present invention; and FIG. 7 is a flow diagram illustrating a process using an animal collar device and system of embodiments of the present invention, for assessing and/or determining and/or monitoring a condition of interest in an animal wearing the animal collar device, according to embodiments of the present invention.

DESCRIPTION OF THE PREFERRED EMBODIMENTS

Figure 1:
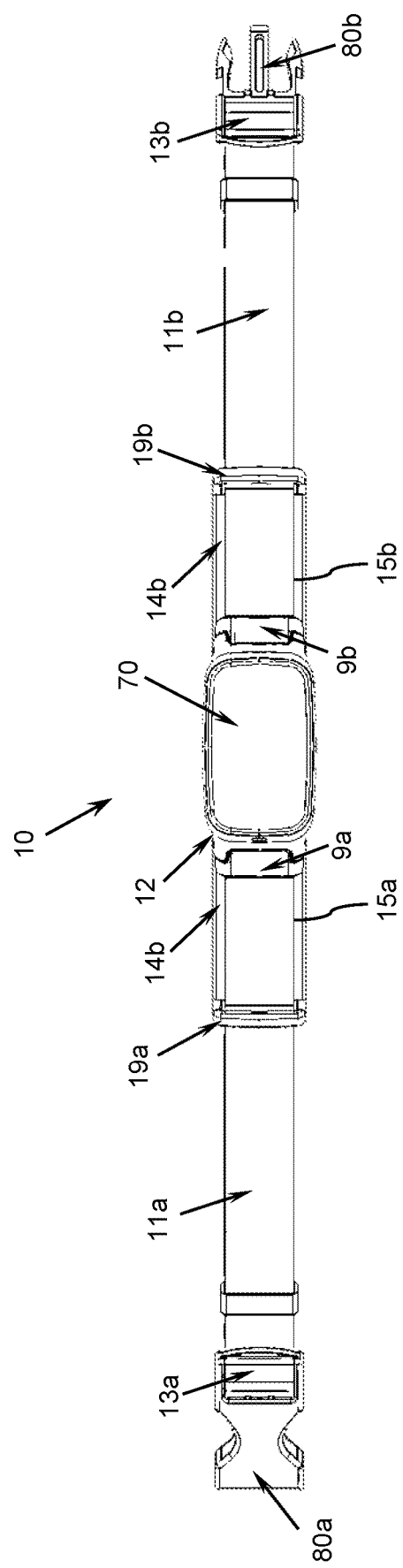
FIG. 1 is a schematic top view of an animal collar device having a band and strap portions with engagement portions attached to ends of the strap portions, according to embodiments of the present invention.

Embodiments of the present invention provide animal collar devices and systems for monitoring health and behavior of animals, and methods for monitoring health and behavior of animals using such animal collar devices and systems.

The principles and operation of the devices, systems, and methods according to present invention may be better understood with reference to the drawings accompanying the description.

Embodiments of the present invention are applicable for use any situation in which non-invasive health and/or behavior monitoring of an animal is desired, and is of particular value when applied to pet animals such as dogs and cats. It is noted, however, that the embodiments of the present invention are also suitable for monitoring the health and/or behavior of non-pet animals, including, but not limited to, livestock (e.g., cattle, sheep, etc.), captive animals in zoos, wild animals in a wildlife reserve or preserve, and tagged animals (for example wild animals that have been tagged for scientific research and/or conservation studies).

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways. Initially, throughout this document, references are made to directions, such as, for example, left and right, top and bottom, upper and lower, forward and backward, and the like. These directional references are exemplary only to illustrate the invention and the embodiments thereof.

Figure 2:
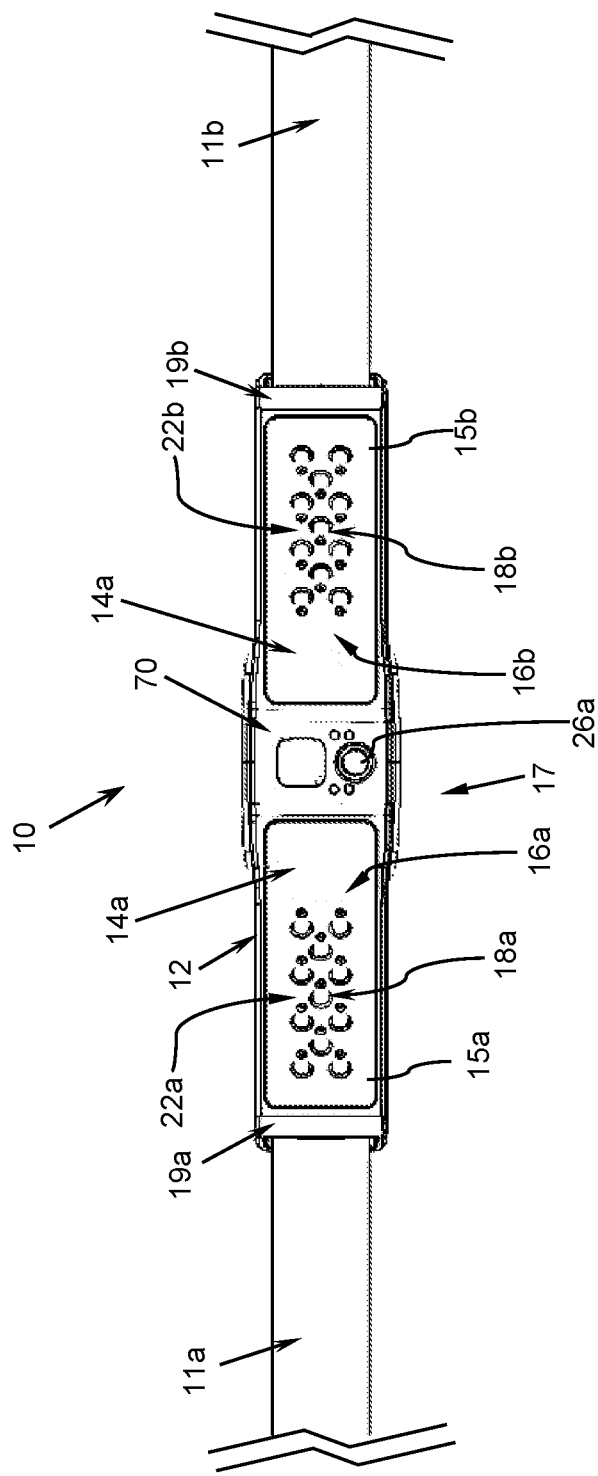
FIG. 2 is a schematic partial bottom view of the animal collar device of FIG. 1, additionally showing a temperature sensor element of a sensor arrangement, and acoustic concentrator elements associated with acoustic sensor elements of the sensor arrangement, according to embodiments of the present invention.
Figure 3:
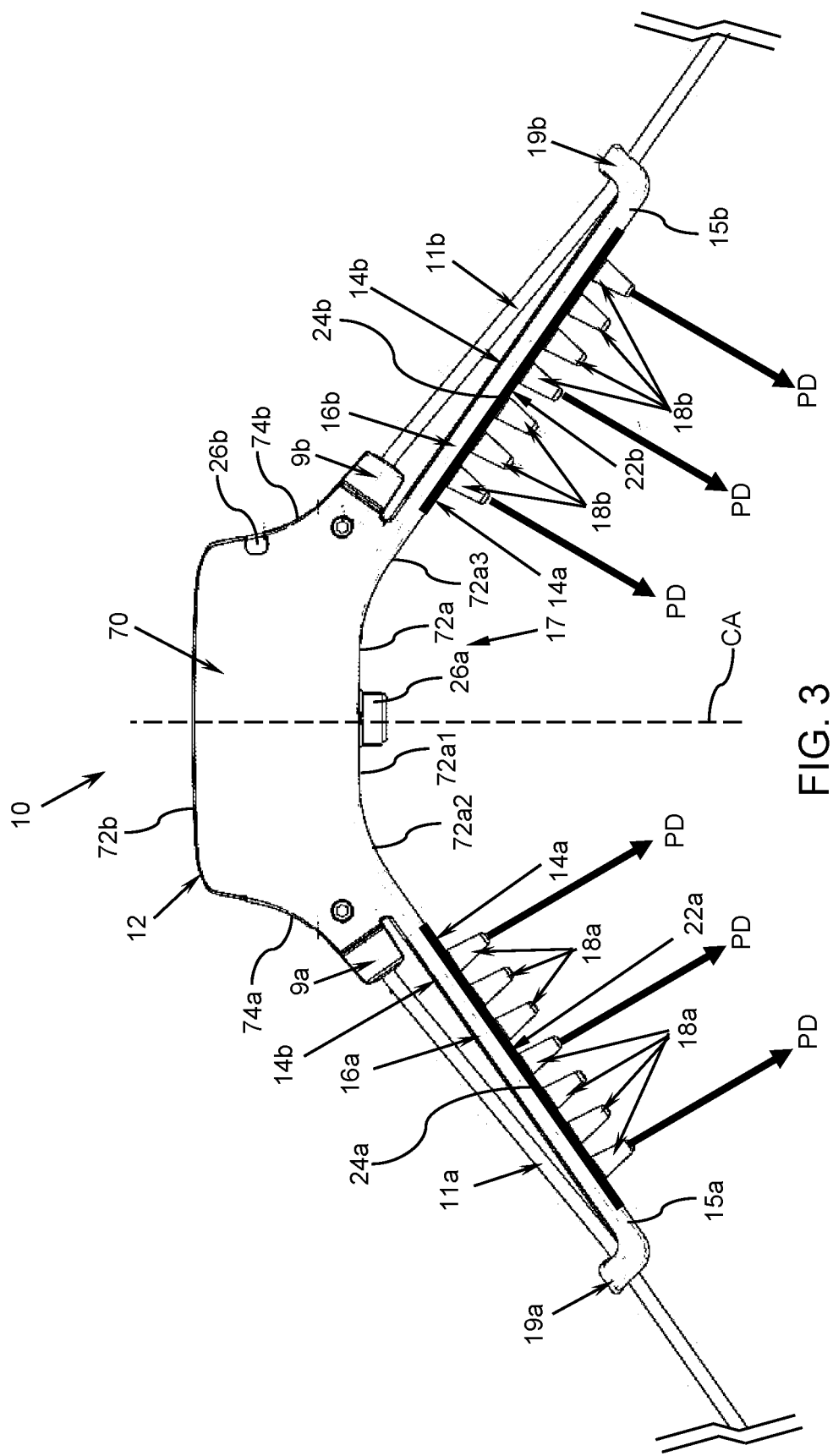
FIG. 3 is a schematic partial sectional side view of the animal collar device of FIGS. 1 and 2, showing the acoustic sensor elements and two temperature sensor elements, according to embodiments of the present invention.
Figure 4:
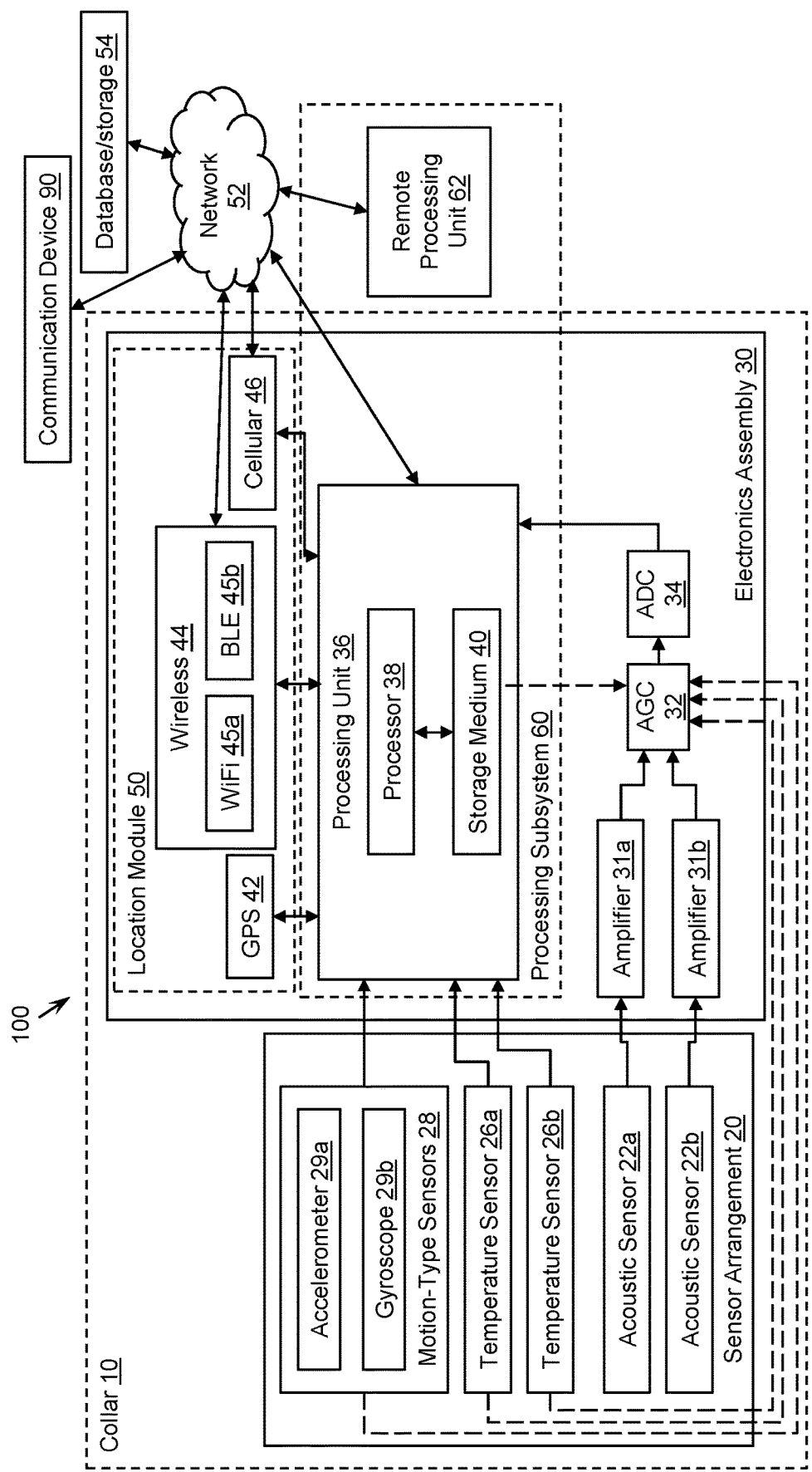
FIG. 4 is a schematic block diagram of a system that includes the animal collar device of FIGS. 1-3, showing the sensor arrangement and an electronics assembly that is part of or attached to the animal collar device, according to embodiments of the present invention.

Referring now to the drawings, FIGS. 1-3 illustrate various views of an animal collar device, generally designated 10, constructed and operative according to a non-limiting embodiment of the present invention, for monitoring health and behavior of an animal. Reference is also made to FIG. 4, which illustrates components of the animal collar device 10 as part of a system 100 deployed in a system environment. As will become apparent, in certain embodiments the system 100 can be formed solely from the animal collar device 10 (such that the animal collar device 10 itself is the system 100), whereas in other embodiments the system 100 includes the animal collar device 10 as well as one or more other components that is/are separate from the animal collar device 10, including, for example, one or more of a remote processing unit 62, a database/storage 54, and a communication device 90, all in network communication with the collar 10 via a network 52. The communication device 90 can be, for example, a mobile communication device, including, but not limited to, a mobile telephone, smartphone, or tablet, or can be a computer, including, but not limited to, a laptop or a desktop computer.

Generally speaking, the animal collar device 10 (referred to hereinafter interchangeably as "animal collar", "collar", or "device") includes a band 12 formed from, or having at least one layer of, an elastic material or flexible material, such as polyurethane. The band 12 is configured to be placed around a portion of the animal, primarily the neck of the animal, although placement of the band 12 around other portions of the animal, such portions of the limbs (legs) and abdominal sections, is also possible. The band 12 includes a first surface 14a (also referred to as a "contact surface" or an "inner surface" or "bottom surface") that is configured to be positioned on the portion (e.g., neck) of the animal so as to come into contact with portions of the fur and/or skin of the animal. The band 12 also includes a second surface 14b (also referred to as an "outer surface" or "top surface") oppositely disposed from the first surface 14a. When the collar is securely deployed (i.e., placed) on the animal, the band 12 is positioned so as to attach to the portion (e.g., neck) of the animal such that the contact surface 14a is in facing relation to the portion of the animal and the outer surface 14b faces away from the portion of the animal, for example toward a viewer (e.g., pet owner, animal trainer/handler) that is looking at the band 12. Many attachment configurations of the band 12 to the portion of the animal are contemplated herein. One particularly suitable but non-limiting exemplary attachment configuration is wrapping of the band 12 around the portion of the animal.

The band 12 generally includes multiple sections or regions. As can be seen in FIGS. 1-3, the band 12 has a central region 17 interposed between two side portions/regions or sides 15a, 15b of the band 12. The sides 15a, 15b are also referred to herein as a left side 15a and a right side 15b. Each of the sides 15a, 15b terminates at a respective end 19a, 19b, which in the illustrated non-limiting embodiment is curved or bent outward away from the surfaces 14a, 14b. In the non-limiting embodiment, the collar 10 also includes strap portions 11a, 11b that are attached via attachment ends 9a, 9b at opposite sides of the central portion 17 and extend circumferentially from the sides 15a, 15b along the band 12. The ends 19a, 19b preferably include openings dimensioned to receive the strap portions 11a, 11b so as to allow the strap portions 11a, 11b to pass therethrough. In the illustrated non-limiting embodiment, each of the strap portions 11a, 11b terminates at a respective end 13a, 13b (opposite the attachment ends 9a, 9b), and each of the ends 13a, 13b has associated therewith (for example attached thereto) an engagement portion 80a, 80b for engaging the collar 10 and/or the band 12 such that the collar 10 and the band 12 (including the strap portions 11a, 11b) wrap around the portion of the animal, and such that the collar 10 (and in certain embodiments the band 12) forms a closed loop (resulting in an annular-like structure). The engagement portions 80a, 80b are correspondingly configured such that an engagement configuration is formed when the engagement portions 80a, 80b are engaged with each other. For example, in operation, the disengaged collar 10 can be placed around the portion of the animal and then engaged (via the engagement portions 80a, 80b) to form a closed loop and around the portion of the animal (i.e., such that the collar 10 and band 12 wrap around the portion of the animal). The engagement portions 80a, 80b can be implemented in various ways, for example as clasps, clips, buckles, and the like. The length of at least one of the strap portions 11a, 11b is preferably adjustable such that the collar 10 can be fitted to animals of different sizes.

Although the illustrated non-limiting embodiment includes strap portions 11a, 11b that are configured to pass through the ends 19a, 19b of the band 12, other embodiments are possible in which no strap portions 11a, 11b are present. In such embodiments, the length of the sides 15a, 15b is preferably increased (as compared to as shown in the illustrated embodiment) and the engagement portions 80a, 80b are attached directly to the ends 19a, 19b.

The collar 10 further includes a sensor arrangement (designated 20 in the block diagram shown in FIG. 4) that includes at least one sensor element, and more preferably a plurality of sensor elements. In preferred but non-limiting embodiments, the sensor elements of the sensor arrangement 20 include at least one (i.e., one or more) acoustic sensor and at least one (i.e., one or more) non-acoustic sensor. Each of the various sensor elements of the sensor arrangement 20 is operative to detect/measure one or more bioparameters of or associated with the animal.

In certain non-limiting embodiments, the sensor arrangement 20 includes a pair of acoustic sensors 22a, 22b that are deployed respectively on the sides 15a, 15b of the band 12, and each having a component thereof embedded in the band 12 at respective regions 16a, 16b. Although the illustrated example shows acoustic sensors 22a, 22b deployed on opposite sides 15a, 15b of the band 12, other embodiments are envisioned in which a single acoustic sensor is employed or in which two (or more) acoustic sensors are employed on the same side of the band 12. In fact, it may be advantageous to employ two (or more) such sensors on the same side in order to increase sensor measurement integrity and accuracy.

In certain preferred embodiments, each acoustic sensor 22a, 22b includes a piezoelectric element 24a, 24b (e.g., one or more layers of piezoelectric material) embedded in respective regions 16a, 16b and extending circumferentially along the band 12. The regions 16a, 16b are located in the respective sides 15a, 15b of the band 12.

The acoustic sensors 22a, 22b are operative to detect (measure) vibrations or any other acoustic signals and to generate signals corresponding to the detected/measured vibrations or acoustic signals. The detection/measurement of the vibrations/acoustic signals by the acoustic sensors 22a, 22b is enabled by the piezoelectric elements 24a, 24b, which transduce element deformations (resultant from vibrations) into electrical charge and signals (commonly known as the Piezoelectric effect).

When the band 12 is positioned on (e.g., wrapped around) the portion of the animal, the vibrations detected/measured by the acoustic sensors 22a, 22b correspond to one or more first bioparameters (that are indicative of vital signs of the animal), which include, but are not limited to, one or more of heart rate, respiration rate, and heart rate variability. For example, when the band 12 is positioned on the portion of the animal (e.g., wrapped around the neck), vibrations corresponding to the animal's heart rate and/or respiration rate can be picked up (i.e., measured, detected) by the acoustic sensors 22a, 22b. It is noted, however, that the fur at the portion of the animal can act as an insulating layer between the acoustic sensors 22a, 22b and the animal's skin at the portion of the animal (where the vibrations are the strongest). Thus, any vibrations that travel through the fur to reach the acoustic sensors 22a, 22b are typically dampened or weakened by the fur.

In order to accurately convey the vibrations to the piezoelectric elements 24a, 24b of the acoustic sensors 22a, 22b, the band 12 has associated therewith one or more sets of acoustic concentrator elements 18a, 18b (referred to as "acoustic concentrators") that are functionally associated with the acoustic sensors 22a, 22b and which convey the vibrations (corresponding to the aforementioned bioparameters and that are indicative of vital signs) to the acoustic sensors 22a, 22b. Preferably, there is one set of acoustic concentrators per acoustic sensor. In the example embodiment illustrated in the drawings, there are two sets of acoustic concentrators 18a, 18b, each set associated with a respective one of the acoustic sensors 22a, 22b. Each set of acoustic concentrators can include a plurality of acoustic concentrators (i.e., one or more concentrators). In the illustrated example, each set of acoustic concentrators includes eleven concentrators, for a total of twenty-two acoustic concentrators.

The acoustic concentrators 18a, 18b project (i.e., protrude) outward from the contact surface 14a of the band 12 in a projection direction (designated by thick arrows and labeled PD in FIG. 3) and are configured to penetrate the fur in the portion of the animal so as to come into proximity or contact with the skin in the portion of the animal in order to accurately convey the vibrations to the acoustic sensors 22a, 22b. Preferably, the collar 10 is placed around a portion of the animal that allows the acoustic concentrators 18a, 18b (and thus the acoustic sensors 22a, 22b) to be placed in proximity to an artery of the animal (such as a main artery of the neck). In addition, the acoustic concentrators 18a, 18b are preferably deployed in association with the regions 16a, 16b of the band 12. In other words, the acoustic concentrator 18a preferably projects from a first part of the contact surface 14a that is in the region 16a that contains piezoelectric element 24a, and the acoustic concentrator 18b preferably projects from a second part of the contact surface 14a that is in the region 16b that contains piezoelectric element 24b.

In preferred embodiments, the acoustic concentrators 18a, 18b are integrally formed with the band 12, and have a base end attached at the contact surface 14a and a projecting (or top) end that is furthest from the contact surface 14a and hence closest to the portion of the animal. The acoustic concentrators 18a, 18b preferably have particular dimension and shape to provide favorable function for conveying vibrations to the acoustic sensors 22a, 22b without causing discomfort to the animal. Further details of operation and a preferred but non-limiting construction of acoustic concentrators are discussed in detail in various publications by PETPACE LTD. (Israel), for example in U.S. Pat. Nos. 9,615,547 and 10,440,938, incorporated by reference in their entireties herein.

With continued reference to FIGS. 1-4, the at least one non-acoustic sensor of the sensor arrangement 20 preferably includes at least one temperature sensor, represented in the drawings as a pair of temperature sensors 26a, 26b, each of which is operative to measure temperature and to provide output signals corresponding to the temperature measurement (i.e., a signal indicative of the measured temperature). In certain embodiments, either or both of the temperature sensors 26a, 26b provides an analog output signal, while in other embodiments either or both of the temperature sensors 26a, 26b provides a digital output signal. The output signals generated by the temperature sensors 26a, 26b can be used by other components of the collar 12 (or system 100) to make determinations about the condition or status of the animal, and can also be used by some of the components of the collar 12 to perform functions.

In certain embodiments, a first one of the temperature sensors 26a is located in the central region 17 of the band and in association with the contact surface 14a of the band 12. Preferably, the first temperature sensor 26a is located on a portion of the contact surface 14a that is in the central region 17 underneath a housing 70. This portion may correspond to a bottom (lower) surface 72a of the housing 70 which forms a part of the surface 14a between the two sides 15a, 15b. A second one of the temperature sensors 26b can be located on or near the central region 17 and in association with the second surface 14b of the band 12, for example on, partially embedded in, or external to the housing 70, for example on a surface of the housing 70 that is associated with the second surface 14b. In the non-limiting illustrated embodiment, the temperature sensor 26b is partially embedded in one of the two curved side surfaces 74a, 74b of the housing 70 which form a continuation with a top (upper) surface 72b of the housing 70.

When the collar 10 is positioned on the animal (e.g., wrapped around the portion of the animal), the first temperature sensor 26a measures the skin or surface temperature of the animal (a bioparameter of the animal), and the second temperature sensors 26b measures the temperature of the immediate environment surrounding the animal (typically within a few (e.g., 1 to 3) inches of the fur surface of the animal, more preferably approximately 1 inch from the fur surface of the animal). The temperature of the immediate environment surrounding the animal is referred to as "ambient temperature", which is a bioparameter associated with the animal. Thus, for example, if a dog is wearing the collar 10 around its neck and is inside of a house, the first temperature sensor 26a will measure the skin or surface temperature of the dog based on temperature readings from the neck area of the dog, and the second temperature sensor 26b will measure the internal temperature of the atmosphere of the house immediately surrounding the dog (preferably approximately 1 inch from the surface of the fur of the dog).

Although the non-limiting embodiments illustrating in the drawings includes two sensors 26a, 26b, any number of temperature sensors can be used. Certain embodiments of the present invention may include more than two temperature sensors. In addition, certain principles according to embodiments of the present invention may operate with a single temperature sensor.

The at least one non-acoustic sensor of the sensor arrangement 20 preferably also includes at least one additional sensor 28 that is a motion-type sensor operative to measure/detect motion and position related bioparameters of the animal, including, for example, position and/or posture and/or acceleration and/or velocity and/or orientation. In the illustrated embodiment, the motion-type sensor 28 includes at least a pair of sensors in the form of one or more accelerometers 29a and one or more gyroscopes 29b. In preferred but not limiting embodiments, the motion-type sensor 28 includes a 3-axis accelerometer 29a and a 3-axis gyroscope 29b, such as MEMS motion sensors available from InvenSense (subsidiary of TDK) of San Jose, CA, USA, that facilitate high-accuracy measurement of both linear and angular motion, position, and orientation.

As alluded to above, the collar 10 preferably also includes a housing 70 that is located in the central region 17 of the band 12. The housing can be attached to the band 12 via any suitable attachment means, including, for example, mechanical attachment (e.g., screws) and/or adhesive bonding. In one set of particularly preferred but non-limiting implementations, the housing 70 is integrally formed with the sides 15a, 15b. When the collar 10 is positioned on the animal (e.g., wrapped around the portion of the animal), the collar 10 is preferably deployed such that the top surface 72b of the housing 70 faces downward (e.g., toward ground).

The housing 70 is preferably configured to retain components of the collar 10, including, some or all components of an electronics assembly (designated 30 in FIG. 4) having electronic components and circuitry that perform various functions, as will be discussed below.

With continued reference to FIGS. 1-3, and with particular reference to FIG. 4, the electronics assembly 30 of the collar 10 preferably includes amplifier circuitry 31a, 31b (also referred to as amplifiers) in signal communication with the acoustic sensors 22a, 22b, automatic gain control (AGC) circuitry 32 (also referred to interchangeably as "AGC", "AGC unit", and "AGC module") in signal communication with the amplifiers 31a, 31b, analog-to-digital conversion circuitry 34 (also referred to interchangeably as "ADC", "ADC unit", "ADC circuitry", "A/D", "A/D unit", and "A/D circuitry") in signal communication with the AGC 32, and a processing unit 36 in signal communication with the ADC 34. The processing unit 36 is also, in certain embodiments, in signal communication with the sensors 26a, 26b, 28. The electronics assembly 30 may also include one or more of a global positioning system (GPS) module 42 that includes a GPS receiver unit, a wireless module 44, and a cellular module 46. In certain embodiments, the accelerometer 29a and/or the gyroscope 29b can also be part of the electronics assembly 30. The various components and modules of the electronics assembly may be integrated onto a single printed circuit board (PCB).

Before explaining the functions of the components of the electronics assembly 30 in detail, it is first noted that the vibration signals picked up by the acoustic sensors 22a, 22b (via the acoustic concentrators 18a, 18b) can, in many cases, include noise (including echo signal components). This may be due in part to the curvature of the band and/or the spacing of the piezoelectric elements 24a, 24b relative to the animal, as well as other environmental effects that contribute to noise. These noise effects, as well as other contributing factors, can result in a noisy vibration signal that is conveyed to the acoustic sensors 22a, 22b (i.e., conveyed to the piezoelectric elements 24a, 24b) and therefore noise in the signal generated by the acoustic sensors 22a, 22b. One conventional approach to combatting noise effects in order to maintain signal integrity relies on deploying acoustic balancer elements (acoustic balancers) on the outer surface 14b at portions/regions that are at least partially behind the acoustic concentrators 18a, 18b. An example of such a conventional approach is illustrated in FIGS. 1 and 3 in aforementioned U.S. Pat. No. 10,440,938. However, such acoustic balancers are typically integrally formed with the surface 14b of the band 12 and project outward from the surface 14b in a direction generally opposite the projection direction PD of the acoustic concentrators 18a, 18b. This integral formation and outward projection of acoustic balancers results in an overly bulky collar that is difficult and less cost effective to manufacture. In addition, the acoustic signals generated by the acoustic sensors 22a, 22b may also be saturated, due to, for example, the noise effects, as well as excessive vibrations, for example due to heavy breathing by the animal as well as animal movement artifacts in the signal.

It is a particularly preferred feature of certain embodiments of the present invention to employ electronic and algorithmic techniques to combat noise and saturation effects in order to maintain integrity of the signals generated by the acoustic sensors 22a, 22b in response to detecting/measuring vibrations, in lieu of acoustic balancers. In particular, according to preferred embodiments of the present invention, signal integrity is maintained by using the AGC 32 to adjust signal gain of at least some of the signals received from the sensor arrangement 20, specifically the signals that represent the bioparameter(s) (e.g., heart rate, respiration rate) corresponding to vibrations detected/measured by the acoustic sensors 22a, 22b. A status/condition of the animal can then be determined based at least in part by processing (using a processing subsystem 60, which can include the processing unit 36 and/or remote processing unit 62) signals received from the AGC 32. The determined status/condition of the animal can be a current status/condition of the animal, and can be based on or indicative of at least one vital sign corresponding to the bioparameters measured by the acoustic sensors 22a, 22b (e.g., heart rate, respiration rate). As will be discussed, the processing subsystem 60 may also determine the status/condition of the animal based further in part by processing signals received from the sensor arrangement 20 that include the signals representing the bioparameter(s) measured by the non-acoustic sensor(s) (e.g., temperature, ambient temperature, motion, posture).

The following paragraphs describe the function and operation of the components of the electronics assembly 30 as well as the processing subsystem 60.

The amplifiers 31a, 31b are in signal communication with the acoustic sensors 22a, 22b and are operative to amplify signals received from the acoustic sensors 22a, 22b to produce amplified signals (i.e., amplified acoustic signals).

The AGC 32 is in signal communication with the sensor arrangement 20, and in particular with the acoustic sensors 22a, 22b via the amplifiers 31a, 31b, and is operative to receive amplified signals from the amplifiers 31a, 31b and to adjust the gain of those received amplified signals. The AGC 32 provides automatic switching between a plurality of gain values to maintain the amplified amplitude of the signals produced by the acoustic sensors 22a, 22b (i.e., the signals produced by the piezoelectric elements 24a, 24b that are amplified by amplifiers 31a, 31b) within a valid range (i.e., between valid levels). The plurality of gain values may, in certain embodiments, be a plurality of discrete gain values that are pre-programmed into a processor or controller embedded in or associated with the AGC 32. In other embodiments, continuous automatic gain adjustment can be provided for example via live feedback to the AGC 32.

The algorithmic gain adjustment performed by the AGC 32 is preferably based on multiple inputs, including the amplitude of the raw amplified signals received from the amplifiers 31a, 31b, as well as sensor data produced by at least one of the non-acoustic sensors. Thus, according to certain preferred embodiments, the AGC 32 is functionally associated with at least one of the non-acoustic sensors, and is operative to receive signals representing the bioparameter(s) measured by the at least one non-acoustic sensor (i.e., sensor data collected by the at least one non-acoustic sensor) either directly or indirectly from the at least one non-acoustic sensor. The functional association between the AGC 32 and the at least one non-acoustic sensor can be embodied in various ways. In one example, the functional association is embodied by signal communication between the at least one non-acoustic sensor and the AGC 32, which can include a direct or indirect connection between the one non-acoustic sensor and the AGC 32. In FIG. 4, this is represented by the dashed arrows extending from each of the sensors 28, 26a, 26b to the AGC 32. In another example, the functional association is embodied by signal communication between the processing unit 36 and the AGC 32, which can include a direct or indirect connection between the processing unit 36 and the AGC 32. In FIG. 4, this is represented by the dashed arrow extending from the processing unit 36 to the AGC 32.

In operation, the AGC 32 checks the amplitude and the saturation percentage of the acoustic signals (i.e., the amplified acoustic signals received from the amplifiers 31a, 31b that represent the bioparameter(s) measured by the acoustic sensors 18a, 18b), and uses sensor data from the temperature sensors 26a, 26b as well as the accelerometer 29a (and optionally also the gyroscope 29b) to make adjustments (decrease or increase) to the gain of the internal AGC amplifier. For example, if the processing subsystem 60 detects a high level of animal activity based on the sensor data provided by the accelerometer 29a (and/or the gyroscope 29b), and that high level of activity translates to the acoustic signals from the acoustic sensors 22a, 22b having a low signal-to-noise ratio (SNR) due to a large amount of movement artifacts, the AGC 32 adjusts the gain of the acoustic signal by decreasing the gain of the acoustic signal in order to keep the amplitude of the acoustic signal below the saturation level and therefore within a valid range.

Figure 5:
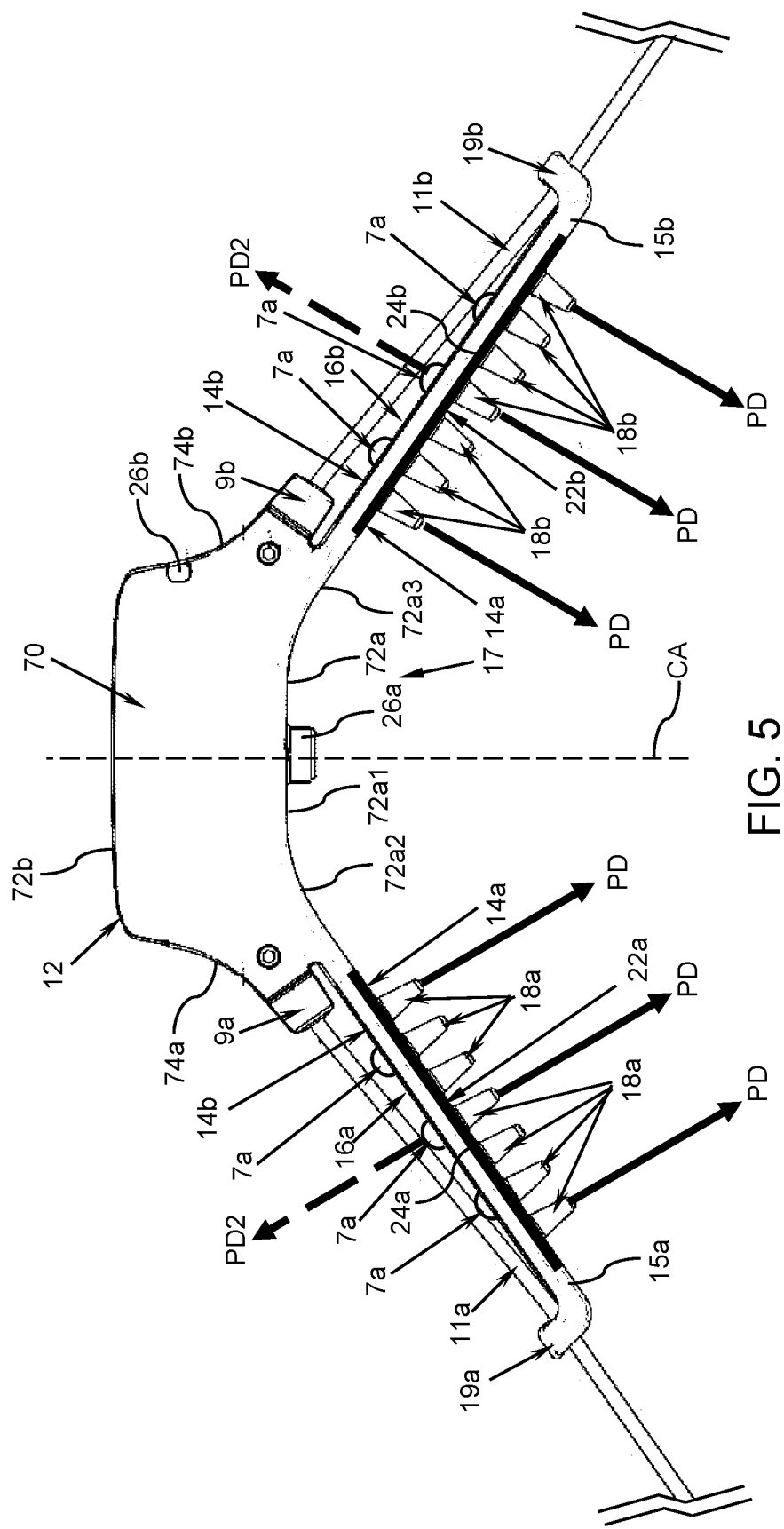
FIG. 5 is a schematic partial side view of an animal collar device similar to FIG. 3, but showing acoustic balancer elements on a top surface of the band and at least partially behind the acoustic concentrator elements, according to an embodiment of the present invention.

Parenthetically, by utilizing the AGC 32 in combination with the processing subsystem 60 to obtain and process signals with high integrity, the band 12 according to certain embodiments of the present invention lacks any acoustic balancers on the outer surface 14b. In such embodiments, the regions of the outer surface 14b that are at least partially behind the acoustic concentrators 18a, 18b (e.g., the regions 16a, 16b of the surface 14b) are smooth regions (i.e., there are no bumps or ridges on the regions 16a, 16b of the surface 14b). However it is noted that in certain embodiments, the band 12 may still include at least one acoustic balancer in order to provide further reduction of noise in the vibration signals. In such embodiments, the at least one acoustic balancer projects from the outer surface 14b and is located at one or more corresponding regions (e.g., regions 16a, 16b) of the outer surface 14b at least partially behind the acoustic concentrator(s) 18a, 18b. One such embodiment is illustrated in FIG. 5. Here, the collar 10 includes two sets of acoustic balancer elements 7a, 7b (also referred to as "acoustic balancers") that project from the outer surface 14b in a second projection direction (designated by thick dashed arrows and labeled PD2 in FIG. 5) that is generally opposite the projection direction PD of the acoustic concentrators 18a, 18b. The first set of acoustic balancers 7a (which may contain a plurality of acoustic balancers) is located on the outer surface 14b at the region 16a, and at least partially behind the acoustic concentrator(s) 18a, such that the acoustic balancers 7a are sandwiched between the surface 14a and the underside of the strap portion 11a. Similarly, the second set of acoustic balancers 7b (which may contain a plurality of acoustic balancers) is located on the outer surface 14b at the region 16b, and at least partially behind the acoustic concentrator(s) 18b, such that the acoustic balancers 7b are sandwiched between the surface 14a and the underside of the strap portion 11b. It is further noted that the acoustic balancing to reduce noise may be further aided by thin a layer of compression resistive and energy absorptive material, such as Poron foam (not shown) that is embedded in the band and that is located between the acoustic sensors 22a, 22b (in particular the piezoelectric elements 24a, 24b) and the contact surface 14b. The use of the thin layer may be instead of or in addition to the acoustic balancers 7a, 7b.

The ADC 34 is in signal communication with the AGC 32. The ADC 34 functions to convert received analog signals into digital signals, as is generally known in the art of signal processing. Any suitable ADC circuitry can be used to implement the ADC 34, such as those commercially available from Texas Instruments of Dallas, TX, USA and Analog Devices of Cambridge, MA, USA. Primarily, the ADC 34 converts the gain adjusted analog signals received from the AGC 32 into digital signals. However, in certain embodiments one or more of the non-acoustic sensors 26a, 26b, 29a, 29b may produce analog signals output, and in such embodiments the ADC 34 is preferably in signal communication with those sensors as well in order to convert those analog signals to digital signals.

The GPS module 42 (referred to interchangeably as a "GPS device" or simply "GPS") includes a GPS receiver unit and is configured to receive signals and information from a satellite navigation system and calculate the geographical position (i.e., location) of the GPS 42. The GPS 42 is typically retained in the housing 70 that is attached to the band 12, and thus the calculated location of the GPS 42 provides an indication of the location of the band 12 (and collar 10).

The wireless module 44 includes one or more transceiver devices capable of transmitting and receiving wireless communication signals and data over a wireless communication channel (e.g., wireless network). In certain embodiments, the wireless module 44 includes a MODEM/transceiver that supports communication using wireless local area network (WLAN) protocols (commonly referred to as Wi-Fi). This WiFi MODEM/transceiver is designated as WiFi module 45a in FIG. 4. In preferred embodiments, the wireless module 44 also includes a MODEM/transceiver that supports Bluetooth communication protocols, more preferably Bluetooth Low Energy (BLE). This BLE MODEM/transceiver is designated as BLE module 45b in FIG. 4. Thus, the wireless module 44 is preferably configured to exchange signals and data with a WLAN network equipment (such as, for example, a router) and configured to exchange signals and data with a Bluetooth device (preferably the BLE MODEM/transceiver is configured as a slave device).

Although FIG. 4 shows the wireless module 44 as having both WiFi module 45a and BLE module 45b, in certain embodiments the wireless module 44 may include only one of these modules.

The cellular module 46 includes one or more transceiver devices capable of transmitting and receiving cellular communication signals and data over a cellular communication channel (e.g., cellular network). For example, the cellular module 46 can include a MODEM/transceiver that exchanges signals and data according to any suitable cellular communication protocol, including, for example, 4G/LTE, 5G, GSM, and the like.

Each of the aforementioned GPS modules 42, wireless module 44, and cellular module 46 devices are capable of providing location data that is indicative of a location of the band 12. In certain cases, the location data can provide a geographic location or position of the band 12. The modules 42, 44, 46 can each form part of a location module 50, that provides location data that is indicative of a location of the band 12. It is noted that the location module 50 can include any or all of the module 42, 44, 46. For example, in certain embodiments, the location module 50 includes the GPS module 42 only, whereas in other embodiments the location module 50 includes both the wireless module 44 and the cellular module 46, whereas in yet further embodiments the location module 50 includes the GPS module 42 and the wireless module 44.

The processing subsystem 60 is associated with the AGC 32. In certain preferred but non-limiting embodiments, the processing subsystem 60 includes the processing unit 36, which is local to the band 12 and is preferably housed as part of the electronics assembly 30 in the housing 70. In certain embodiments, the processing unit 36 is in signal communication with the ADC 34 (thereby providing the association between the processing subsystem 60 and the AGC 32) and receives digitized signals from the ADC 34. These digitized signals include the gain adjusted signals (provided by the AGC 32) that are converted to digital signals (i.e., digitized) by the ADC 34. In certain embodiments, the processing unit 36 is also in signal communication with the sensor arrangement 20 and receives output sensor data directly from one or more of the sensors 26a, 26b, 29a, 29b of the sensor arrangement 20.

The processing unit 36 is a computerized processing unit that has one or more processors 38 coupled to a computerized storage medium 40, such as a computerized memory or the like. The one or more processors 38 can be implemented as any number of computerized processors, including, but not limited to, microprocessors, microcontrollers, application-specific integrated circuits (ASICs), field programmable gate arrays (FPGAs), digital signal processors (DSPs), field-programmable logic arrays (FPLAs), and the like. In microprocessor implementations, the microprocessors can be, for example, conventional processors, such as those used in servers, computers, and other computerized devices. For example, the microprocessors may include x86 Processors from AMD and Intel, Xeon® and Pentium® processors from Intel, as well as any combinations thereof. The aforementioned computerized processors include, or may be in electronic communication with computer readable media, which stores program code or instruction sets that, when executed by the computerized processor, cause the computerized processor to perform actions. Types of computer readable media include, but are not limited to, electronic, optical, magnetic, or other storage or transmission devices capable of providing a computerized processor with computer readable instructions.

The storage/memory 40 can be any conventional or application specific storage media, which although shown as a single component for representative purposes, may be multiple components. The storage/memory 40 can be implemented in various ways, including, for example, one or more volatile or non-volatile memory, a flash memory, a read-only memory, a random-access memory, and the like, or any combination thereof. In certain embodiments, the storage/memory 40 can include one or more components configured to store machine executable instructions that can be executed by the one or more processors 38.

The processing subsystem 60 may, in certain embodiments, include the remote processing unit 62 that is in networked communication with the collar 10 via network 52. The remote processing unit 62 can be instead of or in addition to the processing unit 36. In embodiments in which the processing subsystem 60 consists of only the remote processing unit 62 (i.e., the collar 10 does not include the processing unit 36), the remote processing unit 62 may receive signals and sensor data from the sensors of the sensor arrangement 20 via the network 52. The network 52 may be formed of one or more networks, including for example, the Internet, cellular networks, wide area, public, and local area networks. For example, the collar 10 may communicate with the remote processing unit 62 via the network 52 using one or more of the wireless module 44 and the cellular module 46, or some or some other communications module of the collar 10.

In embodiments in which the processing subsystem 60 consists of only the remote processing unit 62, the association between the processing subsystem 60 and the AGC 32 is provided by signal communication between the remote processing unit 62 and the AGC 32. This may necessitate networked transmission of the signal output from the AGC 32 to the remote processing unit 62 via the network 52 using, for example, one or more of the wireless module 44 and the cellular module 46, or some or some other communications module of the collar 10. Thus, in certain embodiments one or more of wireless module 44 and cellular module 46 may be in signal communication with the AGC 32 and/or the ADC 34.

Although not illustrated in the drawings, the remote processing unit 62 includes one or more computerized processors that is/are coupled to a computerized storage medium (similar to the processing unit 36). In certain embodiments, the remote processing unit 62 can be part of, or hosted by, a remote processing server, such as a cloud processing server. In other embodiments, the remote processing unit 62 can be part of a computer or computer system that is remotely located from the processing unit 36, including, for example, a computer (e.g., desktop, laptop, etc.), or a mobile device (e.g., smartphone, tablet, etc.). The computer or mobile device can be used by a person associated with the animal, for example, an owner of the animal, a trainer, a veterinarian, etc. For example, the computer can be located in the home of the animal owner, or the mobile device can belong to the animal owner. As another example, the computer or mobile device can belong to or be used by a caregiver of the animal, for example the computer or mobile device can belong to a veterinarian or trainer.

The following paragraphs describe the processing functions performed by the processing subsystem 60 in order to determine the status/condition of the animal. It should be understood that the various processing functions performed by the processing subsystem 60 can be performed by the processing unit 36 or the remote processing unit 62 either alone or in combination. For example, in certain implementations the processing unit 36 may be configured to perform some of the processing functions and the remote processing unit 62 may be configured to perform the remaining processing functions, where the processing functions performed by the processing unit 36 and the remote processing unit 62 are distinct. In other implementations, both the processing unit 36 and the remote processing unit 62 may be configured to perform the same processing functions.

Bearing the above in mind, in operation the processing subsystem 60 processes received signals, including the gain adjusted acoustic signals (which represent bioparameters measured by the acoustic sensors 22a, 22b), to determine vital signs of the animal, including breathing rate (BR) (also referred to as respiration rate), pulse rate (PR) (which in nominal situations is indicative of heart rate), and heart rate variability (HRV). Breathing rate information and pulse rate information is inherently embedded in the vibrations picked up by the acoustic sensors 22a, 22b, and the gain adjusted signals from the AGC 32 can be processed by the processing subsystem 60 using suitable signal processing techniques to extract the breathing rate and pulse rate, as well as heart rate variability. Suitable techniques for extracting BR, PR, and HRV include, for example, frequency analysis techniques such as Fourier transform.

In addition to processing the acoustic signals, the processing subsystem 60 also processes signals that represent bioparameters measured by the sensors 26a, 26b, 29a, 29b, to monitor animal behavior. In particular, according to certain embodiments of the present invention, the processing subsystem 60 processes signals (sensor data) received from the accelerometer 29a and the gyroscope 29b to perform activity level and body posture monitoring, and processes signals (sensor data) received from the temperature sensors 26a, 26b to perform temperature-related monitoring.

Activity level monitoring will now be discussed. As mentioned above, the sensor 28 includes a 3-axis accelerometer 29a and a 3-axis gyroscope 29b. These two sensors 29a, 29b preferably operate in tandem to measure linear acceleration and orientation across three axes, thereby allowing measurement of linear vertical (up/down) acceleration, linear horizontal (left/right) acceleration, and linear lateral (forward/backward) acceleration for a measured orientation. These accelerations and orientations can be measured continuously or continually over time by the sensors 29a, 29b, and the sensor data can be processed by the processing subsystem 60 to evaluate the amount of movement (acceleration) of the animal.

In certain embodiments, the processing subsystem 60 processes the sensor data to quantify the movement of the animal by assigning to the animal a fitness index or score. The index or score can be applied for a particular time interval or period. One example methodology for determining fitness index/score is particularly suitable for pet animals, in particular dogs. Although the following description of the fitness index methodology is described within the context of the animal being a dog, this should not be taken as limiting the applicability of the methodology to dogs. The methodology can be adjusted for other animal species, as should be apparent to those of skill in the art.

Bearing the above in mind, and with continued reference to FIGS. 1-4, reference is also made to FIG. 6 which shows a flow diagram detailing a process 600 in accordance with embodiments of the disclosed subject matter. This process includes steps for assigning a fitness index or score to an animal. The process 600 is performed by the system 100 including, for example, the sensor arrangement 20, the electronics assembly 30, the processing subsystem 60, and associated components. Some of the sub-processes of the process 600 are computer-implemented sub-processes, as will become apparent from the subsequent description. The process 600 and its sub-processes are for example, performed automatically, but can be, for example, performed manually, and are performed, for example, in real time.

The process 600 can generally be broken down into two stages. At step 602, a first (or learning) stage is performed, in which labeled historical data, stored for example in database/storage 54, is analyzed by the processing subsystem 60. The historical data includes two groups of data (i.e., two data sets). The first set of data is labeled data of dogs that are identified as highly active (and preferably trained). The second set of data is labeled data of dogs known to be minimally active (for example due to a chronic condition, such as chronic joint disease). The processing subsystem 60 analyzes the two sets of data using various modeling and classification techniques (e.g., ADA boost classifier, random forest, gradient boosting classifier) in order to produce a model or classifier that classifies or differentiates the two groups of dogs as: active, and non-active.

Steps 604-616 correspond to the second (or active) stage. First, at step 604, sensor data is collected from a dog wearing the collar 10 (and in theory can be collected from a large number of dogs, each wearing a collar similar to the collar 10). The sensor data is preferably acoustic sensor data collected by the acoustic sensors 22a, 22b, but may include other sensor data as well. At step 606, the processing subsystem 60 extracts bioparameter data/vital signs (e.g., pulse rate, respiration (breathing rate), etc.) from the collected sensor data. This bioparameter data is "unlabeled", and as will be discussed below the processing subsystem 60 analyzes the unlabeled bioparameter data together with the model/classifier produced in the first stage in order to classify the dog according to an activity label, preferably one of the following four activity labels: non-active, low activity, moderate/medium activity, high activity.

For example, at step 608 the processing subsystem 60 preferably calculates resting pulse rate from the collected sensor data based on sensor measurements performed during periods of low (resting) activity. At step 610 the processing subsystem 60 may then calculate a pulse reserve index (PRI), which is the difference between the estimated maximum pulse rate for typical dogs (in this example 200 beats per minute) and the calculated resting pulse rate.

At step 612, the processing subsystem 60 may calculate a daily activity intensity (DAI) as a percentage of the PRI. The maximum pulse rates achieved during periods of activity are compared to the PRI and expressed as a percentage of the total reserve. For practical but non-limiting purposes, the processing subsystem 60 may divide the DAI into the following three ranges and assign a label or category to each range: 50%-60% of the PRI—low intensity, 61%-80% of PRI—moderate intensity, and above 80% —high intensity. Further subdivision and categorization can be used if necessary or desired. As an example calculation for a low intensity score, the pulse rate during exercise can be calculated as 50%-60% of the PRI+resting pulse rate.

At step 614, the processing subsystem 60 calculates a daily activity volume (DAV) as the duration of time (e.g., in minutes) in which the dog was at a certain activity intensity (e.g., low intensity, moderate intensity, high intensity) as calculated in step 612. For example, the maximum daily activity volume is achieved when the dog maintains a certain intensity level for a 30-minute activity session.

At step 616, the processing subsystem 60 calculates a fitness index (also referred to as a physical activity index, or PAI) for the dog. For example, the processing subsystem 60 may calculate the fitness index by multiplying the DAI and DAV calculated in steps 612 and 614, respectively. The PAI is a metric that represents the level of physical fitness (physical activity achieved), and provides a quantitative indication of the total fitness of the dog on a given day, and can serve as a basis for health assessment and planning for improvement.

The information produced as output by the process 600 can be provided, for example in the form of an alert or notification, to a person associated with the animal (e.g., pet owner, trainer, veterinarian, etc.) by way of transmission to a communication device (e.g., the communication device 90) in networked communication with the collar 10. The alert/notification can be sent in various formats, such as, for example, as a text message (e.g., short message service (SMS), multimedia messaging service (MMS), etc.), email, and the like.

Body posture monitoring will now be discussed. In order to monitor body posture, the gyroscope 29b measures orientation across three axes, and the accelerometer 29a measures linear and angular acceleration across the three axes, thereby allowing measurement of linear and angular acceleration in all three axes for a measured orientation. The sensors 29a, 29b can be configured to measure the aforementioned accelerations and orientations continuously or continually over time, or can be configured to perform "on demand" measurements (for example in response to a request from a user/operator sent via the communication device 90). The processing subsystem 60 can process the sensor data from the sensors 29a, 29b to characterize the animal's posture, behavior, and actions (including activity).

In combination, the activity level and body posture monitoring allow the system 100 to identify one or more of the following activities and/or postures of the animal: lying down laterally, lying on belly/chest, lying on back, sitting, standing on four legs, standing on hind legs, jumping, trotting, running, eating/drinking, sniffing, urinating, defecating, limping hind leg, limping front leg, scratching with hind leg, shaking leg, turning to lick, scooting, shaking, and stretching.

Temperature-related monitoring will now be described. As mentioned above the sensor arrangement 20 preferably includes a pair of temperature sensors 26a, 26b. The temperature sensors 26a, 26b are preferably configured to provide continuous or continual temperature measurements, for example by way of time-dependent temperature information bearing signals. As discussed above, when the collar 10/band 12 is properly positioned on (e.g., wrapped around) the portion of the animal, the first temperature sensor 26a measures the skin or surface temperature of the animal, and the second temperature sensors 26b measures ambient temperature. Thus, the temperatures measured by the two sensors 26a, 26b will be different (likely significantly different) when the collar 10/band 12 is positioned on (e.g., wrapped around) the portion of the animal. The processing subsystem 60 may, in certain embodiments, process and analyze the temperature sensor measurements to determine various conditions of the animal. For example, the processing subsystem 60 may, in certain embodiments, analyze the temperature measurements provided by the temperature sensor 26a to determine a fever condition of the animal (for example if the temperature measurement indicates an animal skin or surface temperature outside of a nominal skin or surface temperature range). Detection of a fever condition may be supplemented by sensor data from one or more of the other sensors. For example, an increased breathing rate (derived from the acoustic sensor 22a, 22b data) and/or posture indicative of lying down (from sensors 29a, 29b) and/or little to no movement or lethargic movement (from sensors 29a, 29b) may also indicate a fever condition.

As another example, the processing subsystem 60 may analyze the temperature measurements provided by the temperature sensors 26a, 26b to determine a risk of extreme temperature for the animal. For example, the processing subsystem 60 may calculate a difference between the temperature measurements provided by the two sensors 26a, 26b in conjunction with the activity level and the temperature measurement provided by the temperature sensor 26a to determine whether the skin or surface temperature of the animal (measured by the temperature sensor 26a) is normal or abnormal. In particular, the processing subsystem 60 may calculate the difference between the temperature measurements provided by the two sensors 26a, 26b in conjunction with the activity level to determine an acceptable range of the skin/surface temperature of the animal. The processing subsystem 60 may then compare the skin/surface temperature of the animal (measured by the temperature sensor 26a) to the determined acceptable temperature range. If the skin/surface temperature of the animal is within the determined acceptable range, the processing subsystem 60 can provide an indication that the skin/surface temperature of the animal is normal. If the skin/surface temperature of the animal is outside of the determined acceptable range (specifically above the maximum temperature of the determined acceptable range), the processing subsystem 60 can provide an indication that the skin/surface temperature of the animal is abnormal—specifically that the animal is developing a fever or hypothermia.

In addition, the measurements provided by temperature sensor 26a can be used to determine the proximity of the acoustic sensors 22a, 22b and/or the acoustic concentrators 18a, 18b to the artery of the animal. In particular, the difference between the measured skin/surface temperature of the animal (measured by the temperature sensor 26a) and the maximum skin/surface temperature of the animal can be indicative of the proximity of the band 12 to the animal's skin, and hence the proximity of the acoustic sensors 22a, 22b and/or the acoustic concentrators 18a, 18b to the artery of the animal. In addition, small changes to the measured skin/surface temperature of the animal (measured by the temperature sensor 26a), in particular correlated with activity level and/or body position, can point to good band 12/collar 10 attachment, and hence good contact of the acoustic sensors 22a, 22b and/or the acoustic concentrators 18a, 18b in proximity to the artery of the animal.

As alluded to and discussed above, the sensor data, that is received by and/or derived by the processing subsystem 60 from the measurements performed by the sensor arrangement 20, can be utilized and further processed by the processing subsystem 60 together with other data, enabling the system 100 to perform a plurality of functions. Some of those exemplary functions have been discussed above (e.g., fitness index). Additional exemplary functions will now be described.

According to certain preferred embodiments of the present invention, the system 100 provides enhanced management of one or more conditions of interest (e.g., one or more diseases) that may inflict the animal. With continued reference to FIGS. 1-4, reference is also made to FIG. 7 which shows a flow diagram detailing a process 700 in accordance with embodiments of the disclosed subject matter. This process includes an algorithm for assessing/determining/monitoring a condition of interest in an animal. The process 700 is performed by the system 100 including, for example, the sensor arrangement 20, the electronics assembly 30, the processing subsystem 60, and associated components. Some of the sub-processes of the process 700 are computer-implemented sub-processes, as will become apparent from the subsequent description. The process 700 and its sub-processes are for example, performed automatically, but can be, for example, performed manually, and are performed, for example, in real time.

The process 700 begins at step 702, where a condition of interest is selected and a type of analysis for the identified condition of interest is selected. The selection of the condition of interest and the analysis type can be performed by a user associated with the system 100, for example a veterinarian, a pet owner, caregiver, trainer, etc, via an interface with the processing subsystem 60. For example, a pet owner may provide the selection via a user interface to the remote processing unit 62 when implemented as part of a home computer, or via a user interface of communication device 90 in network communication with the collar 10 via the network 52.

At step 704 a data collection methodology is selected (again, for example, by a user associated with the system 100). Step 704 can be executed in parallel with step 702, or prior to step 702. The data collection methodology defines parameters for collecting data from various other animals in order to provide accurate analysis results. The parameters for collecting data can include, for example, the number of groups of animals from which to collect data, the number of animals in each group, and attributes of the animals in the groups (e.g., age, weight, preconditions, diseases that previously inflicted or currently inflict animals in the groups, etc.).

At steps 706 and 708 (which may be executed in parallel or sequentially in any order) data is collected in accordance with the methodology (parameters) defined in step 704. Data from a control group of animals is collected at step 706, and data from a group of animals having (i.e., positive for) the condition of interest (defined in step 702) is collected at step 708. As should be apparent, the animals in both groups should be of the same species as the animal wearing the collar 10. The control group of animals includes animals that are not positive for the condition of interest, and preferably includes "healthy" animals, i.e., animals that are not known to be positive for any disease or adverse condition. The data collected from the control group is referred to as "control data", "control data set", "first data" or a "first data set", and the data collected from the group of animals having the condition of interest is referred to as "second data" or a "second data set". The collected data sets may be stored in a database or memory, such as database/storage 54 that is connected to the network 52 and/or the storage medium 40 of the processing unit 36.

At step 710, the processing subsystem 60 trains a machine learning model by feeding the first and second data sets to the machine learning model, which analyzes the two data sets together to identify/determine data patterns that are typical and distinct to each one of the respective first and second data sets. In other words, the machine learning model determines first data patterns that are associated with the first data set (distinct to the first data set and contrary to the second data set), and determines second data patterns that are associated with the second data set (distinct to the second data set and contrary to the first data set). The processing subsystem 60 can then check the accuracy of the trained machine learning model by feeding one or more test data sets (e.g., a data set collected from the control group and/or a data set collected from a group of animals having the condition of interest) to the machine learning model. Such training methodologies are well-known in the art of machine learning.

At step 712, the collar 10 is deployed on the animal (i.e., attached to the animal such that the band 12 is positioned on (e.g., wrapped around) the portion of the animal). This step may be executed at any stage, including prior to any of steps 702-710. At step 714, the processing subsystem 60 processes signals associated with signals generated by the sensor arrangement 20 to derive bioparameter data for the bioparameters measured by the acoustic sensors 22a, 22b and bioparameter data for the bioparameters measured by one or more of the non-acoustic sensors 26a, 26b, 29a, 29b. As should be apparent, this processing may include any of the processing steps discussed above.

At step 716, the processing subsystem 60 processes the derived bioparameter data together with the data patterns determined at step 710 to determine information associated with the condition of interest in the animal. The processing executed at step 716 is according to an algorithm based on the machine learning model. The information determined at step 716 is also preferably in accordance with the type of analysis for the identified condition of interest selected at step 702. For example, the analysis type selected at step 702 may be one or more of a classification type, prediction type, anomaly identification and/or trend type. If classification type is selected, the processing at step 716 for example classifies the bioparameter data derived at step 714 as being indicative or not indicative of having the condition of interest. If prediction type is selected, the processing at step 716 for example can predict early onset of the condition of interest based on the bioparameter data derived at step 714 and the data patterns determined at step 710. If anomaly identification and/or trend type is selected, the processing at step 716 for example identifies anomalies and/or trends in the bioparameter data derived at step 714 that may indicate positive diagnosis for the condition of interest, or recovery/remission of the animal.

The following paragraphs described some examples of conditions of interest, as well as the types of sensor data and the processing that can be applied to the sensor data in order to diagnose the conditions of interest.

In one example, the condition of seizures/convulsions can be detected/diagnosed by employing one or more of the sensors 28 to detect/sense activity data for example by detecting patterns of movement suspicious of seizures (such as, for example, paddling, head shaking, twitching). One or more of the sensors 28 may also detect/sense position data to confirm that the activity data pattern must happen while the pet is lying down (on either side). In certain embodiments, the processing subsystem 60 can assign each of the activity and position data a pre-determined score, and then evaluate the combined (summed) score against a threshold to make an assessment of whether the animal is having seizures/convulsions. If the thresholding is inconclusive, additional sensor data can be used to supplement the analysis, including, for example, sensor data from the acoustic sensors 22a, 22b. For example, pulse rate and/or breathing rate data (extracted from the signals provided by the acoustic sensors 22a, 22b) can be used to supplement the activity and position data. For example, increased pulse rate at rest and/or increased breathing rate at rest, in combination with activity and position data scores that are above or near the threshold can provide an indication of seizures/convulsions.

As another example, the condition of gastric dilation and volvulus (GDV) can be detected/diagnosed by assigning each of a plurality of parameters (e.g., activity, position, posture, pulse rate, breathing rate, skin or surface temperature, etc.) that are detected by the various sensors of the sensor arrangement 20 a pre-determined score, and then combining the scores (for example by summing the individual scores) and evaluating the combined score against a threshold. If the combined score is above the threshold, the processing subsystem 60 can conclude a positive diagnosis for GDV, and in certain embodiments may generate an alert/notification and send the alert/notification to a communication device (e.g., the communication device 90) in networked communication with the collar 10 and operated by a person associated with the animal (e.g., pet owner, trainer, veterinarian, etc.). The alert/notification can be sent in various formats, such as, for example, as a text message (e.g., short message service (SMS), multimedia messaging service (MMS), etc.), email, and the like.

In general, in order to combine data received from the various sensors to include information about environments or states of the animal, the sensor arrangement 20 may be configured to measure at least one of the following characteristics of the animal for output to the processing subsystem 60: sleeping/resting patterns, eating/drinking patterns, position patterns relating to the animal relieving itself and existence of stress or pain.

For example, for GDV, the processing subsystem 60 can base a suspicion of GDV at least in part on scoring at least two bioparameters from among: (i) restlessness including reluctance to lie down or pacing, (ii) vomiting sounds (iii) sounds indicative of not eating, (iv) sounds indicative of grunting or groaning, (v) sounds indicative of pain, (vi) increased respiration rate and respiration effort, (vii) increased pulse rate (viii) irregular pulse rhythm (ix) loss of sinus arrhythmia, and (x) a pattern of ingestion of a large meal followed by exercise followed by attempts to vomit, and comparing a cumulative score of all scored bioparameters to a threshold cumulative score or to a threshold cumulative range.

Likewise, for the condition of interest of hyperthyroidism, the processing subsystem 60 can base a suspicion of hyperthyroidism at least in part on scoring at least two bioparameters from among: (i) increased activity level, (ii) vomiting sounds (iii) sounds indicative of not eating, (iv) sounds indicative of vomiting or diarrhea, (v) increased pulse rate or irregular pulse rate, (vi) increased respiration rate, (vii) increased number of visits to a litter box (viii) increased frequency or time spent of drinking as measured by acoustic accelerometer, (ix) increased frequency and time spent eating as measured by proximity sensors, comparing a cumulative score of all scored bioparameters to a threshold cumulative score or to a threshold cumulative range; and measuring a persistence over time of either the cumulative score or the abnormal pattern.

In certain embodiments, the accelerometer 29a may be implemented as an acoustic accelerometer that is configured to measure sounds. In such embodiments, the accelerometer 29a can be configured to measure a presence of one or more animal sounds, including one or more of: yelping, whining, wheezing, hissing, purring, stridor, stertor, coughing, barking, growling and grunting.

As mentioned above, certain embodiments of the present invention are of particular value when applied to pet animals such as dogs and cats. If the animal is a dog, the system 100 may be configured to determine a suspicion of one or more conditions of interest in dogs, including one or more of: skin allergies, ear infection, skin infection, upset stomach/vomiting, arthritis, lameness, intestinal upset/diarrhea, bladder infection, periodontitis/dental disease, obesity and pain. If the animal is a cat, the system 100 may be configured to determine a suspicion of one or more conditions of interest in cats, including one or more of: bladder infection, periodontitis/dental disease, overactive thyroid, chronic kidney disease, upset stomach/vomiting, diabetes, intestinal upset/diarrhea, skin allergies, lymphosarcoma, and upper respiratory infection.

According to certain preferred embodiments of the present invention, the system 100 provides functionality to detect whether or not the collar 10/band 12 is positioned on (e.g., wrapped around) the portion of the animal based on the sensor data received by and/or derived by the processing subsystem 60 from the measurements performed by the sensor arrangement 20. In particular, the processing subsystem 60 is preferably configured to process signals associated with signals generated by the sensor arrangement 20 to produce a metric that is indicative of whether or not the collar 10/band 12 is positioned on the portion of the animal. This detection is referred to herein as "off-animal detection".

Parenthetically, the signals associated with signals generated by the sensor arrangement 20 can include the raw signals generated by the sensors of the sensor arrangement 20, as well as modified (i.e., pre-processed) raw signals, for example the amplified and gain adjusted acoustic signals provided by the acoustic sensors 22a, 22b.

In certain embodiments, the off-animal detection is based primarily on sensor data derived from measurements performed by the temperature sensors 26a, 26b. For example, the processing subsystem 60 may process first signals produced by the first temperature sensor 26a which correspond to one or more first temperature measurements, and may process second signals produced by the second temperature sensor 26b which correspond to one or more second temperature measurements. As discussed above, when the collar 10/band 12 is properly positioned on (e.g., wrapped around) the portion of the animal, the first temperature sensor 26a measures the skin or surface temperature of the animal, and the second temperature sensors 26b measures ambient temperature. Thus, the temperatures measured by the two sensors 26a, 26b should be different (likely significantly different) when the collar 10/band 12 is positioned on the portion of the animal.

The processing subsystem 60 may process the first and second signals to compare the first and second temperature measurements and form a metric that is indicative of whether or not the collar 10/band 12 is positioned on the portion of the animal. For example, the processing subsystem 60 may compare one or more parameters or statistics of the first and second signals (e.g., mean, variance, maximum value, minimum value, etc.) to form the metric.

In one simple example, the processing subsystem 60 compares the absolute difference of the average (over a given time period/interval, which may be, for example, several minutes, several hours, etc.) of the two signals to form the metric, and then evaluates the metric against a threshold. For example, if the first temperature signal has an average of $T_1$ and the second temperature signal has an average of $T_2$, the processing subsystem 60 can evaluate the metric $|T_1-T_2|$ against a predetermined threshold TH (which can be set to a small number, for example in the range of 0-5), such that, for example, if $|T_1-T_2| \geq TH$ the processing subsystem 60 determines that the collar 10/band 12 is positioned on the portion of the animal, whereas if $|T_1-T_2| < TH$ the processing subsystem 60 determines that the collar 10/band 12 is not positioned on the portion of the animal.

In another example, the processing subsystem 60 compares the ratio of the average of the two signals to form the metric, and then evaluates the metric against a threshold. For example, if the first temperature signal has an average of $T_1$ and the second temperature signal has an average of $T_2$, the processing subsystem 60 can evaluate the metric $T_1/T_2$ against a predetermined threshold TH (which can be set to a small number close to one, for example in a range from approximately 1.05 to approximately 1.15), such that, for example, if $T_1/T_2 \geq TH$ the processing subsystem 60 determines that the collar 10/band 12 is positioned on the portion of the animal, whereas if $T_1/T_2 < TH$ the processing subsystem 60 determines that the collar 10/band 12 is not positioned on the portion of the animal.

In the examples provided above, instantaneous temperature measurements can also be used instead of average temperature. For example, the metric can be formed from the instantaneous temperature measurement provided by the temperature sensor 26a and the instantaneous temperature measurement provided by the temperature sensor 26b.

The threshold testing described above allows the processing subsystem 60 to provide an indication, with a certain level of confidence, whether or not the collar 10/band 12 is positioned on the portion of the animal. If the processing subsystem 60 detects, with high enough confidence, that the collar 10/band 12 is not positioned on the portion of the animal, the processing subsystem 60 may send a notification (e.g., an alert, alarm, etc.) to a user associated with the system 100, for example via a transmission by one or more of the wireless transceiver 44 and the cellular transceiver 46 over the network 52. The notification may be sent to a communication device, associated with the user, that is in network communication with the collar 10, such as the communication device 90. The notification can be sent in various formats, such as, for example, as a text message (e.g., short message service (SMS), multimedia messaging service (MMS), etc.), email, and the like. In certain preferred but non-limiting embodiments, the notifications are sent from the collar 10 to the communication device 90 indirectly, via for example a remote server, such as a cloud server (e.g., Data Cloud). It is noted, however, that other embodiments providing direct communication between the collar 10 to the communication device 90 are contemplated herein.

In certain embodiments, the metric threshold testing described above can be supplemented by incorporating additional sensor data, for example bioparameter data for the bioparameters measured by the acoustic sensors 22a, 22b and/or bioparameter data for the bioparameters measured by the sensor 29a and/or sensor 29b. For example, if the calculated metric is close to a given threshold such that initial determination by the processing subsystem 60 of whether or not the collar 10/band 12 is positioned on the portion of the animal is inconclusive, the processing subsystem 60 may utilize bioparameter data derived from measurements performed by any of the sensors 22a, 22b, 29a, 29b to determine whether or not the collar 10/band 12 is positioned on the portion of the animal. For example, if the temperature measurements provide an initial indication that the collar 10 is not positioned on the portion of the animal, and if bioparameter data derived from measurements performed by the acoustic sensors 22a, 22b is indicative of no pulse rate or respiration rate, the processing subsystem 60 may determine that the collar 10/band 12 is not positioned on the portion of the animal. Similarly, if bioparameter data derived from measurements performed by the sensor 29a and/or sensor 29b is indicative of no movement or a negligible amount of movement, the processing subsystem 60 may also determine that the collar 10/band 12 is not positioned on the portion of the animal.

The processing subsystem 60 may, in certain embodiments, further enhance the aforementioned off-animal detection by comparing current bioparameter data with historical bioparameter data. For example, the processing subsystem 60 may compare one or more of current temperature measurements, pulse rate, respiration rate, movement, or posture of the animal with corresponding historical data for that same animal that is stored in a storage or database, such as database/storage 54 or storage medium 40.

As mentioned above, the modules 42, 45a, 45b, 46 can each form part of a location module 50, that provides location data that is indicative of a location of the band 12. Each of these modules has associated power consumption, accuracy, and availability parameters. In certain embodiments, the system 100 can employ a hierarchical structure for location module utilization, whereby the hierarchy is as follows: BLE module 45b, WiFi module 45a, cellular module 46, GPS module 42. In certain embodiments, the processing subsystem 60 may selectively utilize the location data provided by the modules 42, 45a, 45b, 46 according to these parameters, by selectively tasking one or more of the modules 42, 45a, 45b, 46 to provide location data.

The power consumption, accuracy, and availability parameters for each of the modules according to this hierarchy will now be discussed.

The BLE module 45*b* has inherently low power requirements as a result of the BLE protocol. Amongst the different modules 42, 45*a*, 45*b*, 46, the BLE module 45*b* typically has the lowest power consumption. The BLE module 45*b* also provides high-accuracy location, but the location data is typically only available when the BLE module 45*b* is paired with a corresponding application that is installed and executed on a corresponding communication device, such as communication device 90. Thus, as compared to the other modules 42, 45*a*, 46, the BLE module 45*b* provides high-accuracy location with low power requirements but moderate availability. In certain embodiments, the BLE module 45*b* can be used to provide location data by default.

The WiFi module 45*a* has moderate/medium power requirements, and also provides moderate-accuracy location (i.e., less accurate than the location provided by the BLE module 45*b*). As should be apparent, the WiFi module 45*a* is only available to provide location data when the WiFi module 45*a* is within required proximity to a WLAN access point (e.g., router, repeater, etc.). In addition, the location data provided by the WiFi module 45*a* may be indicative of the location of the WLAN access point itself and not the location of the WiFi module 45*a*. This contributes to the lower location accuracy as compared to, say, the BLE module 45*b*. However, the location accuracy provided by the WiFi module 45*a* may still be sufficient to identify the general location of the collar 10, which may be adequate in certain cases.

The cellular module 46 also has moderate/medium power requirements, similar to the WiFi module 45*a*, and can provide moderate-accuracy location (similar to the WiFi module 45*a*) or lower-accuracy location depending on the modality of operation of the cellular module 46. For example, cellular modules operating according LTE network protocols can provide location/positioning using various methods that have corresponding accuracies. As should be apparent, the cellular module 46 is only available to provide location data when the cellular module 46 has cellular network coverage.

The GPS module 42 has high power requirements (i.e., amongst the different modules 42, 45*a*, 45*b*, 46, the GPS module 42 typically has the highest power consumption), but provides high-accuracy location (similar to the accuracy provided by the BLE module 45*b*). As should be apparent, the GPS module 42 is only available to provide location data when the GPS module 42 is in a GPS available area, typically outdoors and with a view to the open sky.

According to certain embodiments of the present invention, the processing subsystem 60 is configured to process signals associated with signals generated by the sensor arrangement together with the location data so as to produce correlated data that includes a correlation between location of the collar 10/band 12 and one or more of: vital signs of the animal, activity of the animal, movement of the animal, and posture of the animal. In particular, the processing subsystem 60 is preferably configured to process sensor data (derived from signals provided by one or more of the sensors 22*a*, 22*b*, 26*a*, 26*b*, 29*a*, 29*b*) together with the location data provided by the location module 50 (i.e., provided by one of the modules 42, 45*a*, 45*b*, 46) to produce the correlated processed sensor data and location data. In general terms, this correlated data can be described as location tagging of the processed sensors data with the location data. This enables the system 100 to produce a correlation map between location and vital signs/activity/movement/posture. In certain embodiments, the location data and/or sensor data is time-tagged.

For example, vital sign data (derived by the processing subsystem 60 by processing the gain adjusted acoustic sensor signals) can be tagged with the location data that indicates the location of the collar 10/band 12 when the acoustic sensor data was collected. For example, consider a scenario in which a dog owner accompanies his/her dog (having the collar 10 wrapped around its neck) to a dog park. The vital sign data, e.g., pulse rate and breathing rate, derived from the acoustic sensors 22*a*, 22*b* would be elevated compared to nominal pulse rate and breathing rate for that dog. In addition, the cellular module 46 or the GPS module 42 provides location data that is indicative of the dog park location. The processing subsystem 60 correlates the elevated pulse rate and breathing rate with the dog park location. As another example, consider the scenario when a dog is home during the day while its owners are out of the house (e.g., away at work). The vital sign data, e.g., pulse rate and breathing rate, together with the activity and posture monitoring, may indicate nominal levels or that the dog is asleep, and the WiFi module 45*a* or BLE module 45*b* provides location data indicative of the home location. The processing subsystem 60 correlates the nominal pulse rate and breathing rate with the home location.

In certain embodiments, the processing subsystem 60 can switch between different location module modes depending on requirements for one or more of power consumption, accuracy, and availability. If lower accuracy location data is needed, the processing subsystem 60 can operate in a first mode in which location data is acquired via the cellular module 46 or via the WiFi module 45*a*. If higher accuracy location data is needed, the processing subsystem 60 can operate in a second mode in which location data is acquired via the BLE module 45*b* or via the GPS module 42. The processing subsystem 60 is preferably configured to switch between the first and second modes based on the location data accuracy needs/requirements of the system and based on the availability of the particular location module. For example, higher accuracy location data may be needed or desired in situations in which the animal is a pet animal and has run away. In such a situation, location data provided by the cellular module 46 may not be enough to provide an accurate location of the animal, and the system 100 can switch to the second mode and utilize location data from the GPS module 42.

In certain embodiments, the system 100 is preferably configured to operate in the first mode by default, and only switch to the second mode in a limited capacity or as needed. The switching between the first and second modes may be performed automatically by the processing subsystem 60.

In other embodiments, the processing subsystem 60 is configured to selectively switch between the two modes in response to receiving a control command, for example issued by the communication device 90. This enables a person (e.g., a pet owner, trainer, veterinarian, etc.) that is associated with the animal (and that is a user of the communication device 90) to provide a controlled input to the processing subsystem 60 to switch to the first mode or second mode.

As discussed above, the band 12 is formed from, or has at least one layer of, an elastic material or flexible material. Thus, the band 12 has some inherent degree of flexibility which allows the band 12 to be flexed inward and outward, thereby moving the contact surface 14*a* toward the animal and away from the animal, respectively. In conventional collars, such as the collars described in the aforementioned U.S. Pat. Nos. 9,615,547 and 10,440,938, the collar/band must be placed/wrapped around the portion (e.g., neck) of the animal and engaged (via an engagement mechanism, e.g., clasp, buckle, etc.) in order to flex the band inward and urge the acoustic concentrators to penetrate the fur and pick up the vibration signal to convey to the acoustic sensors. This conventional design can become problematic in situations where the collar becomes disengaged (possibly accidentally or inadvertently disengaged), for example if the clasp/buckle accidentally becomes undone. In such situations, the conventional collar may fall off of the animal, or may simply become loose around the portion of the animal preventing accurate measurements by some of the sensors of the sensor arrangement, in particular the acoustic sensors. In both cases, measuring/detecting bioparameters and/or vital signs of the animal are inhibited when the collar becomes disengaged.

In order to avoid situations in which disengagement of the collar 10 and/or band 12 results in no sensor measurements or reduced-quality sensor measurements and/or the collar 10 falling off of the animal, it is a particularly preferred feature of certain embodiments of the present invention for at least one of the regions 16a, 16b of the band 12 to be biased inward along the projection direction PD such that the acoustic concentrators 18a, 18b penetrates the fur in the portion of the animal without necessitating engaging the collar 10 when the band 12 is positioned on the portion of the animal. In particular, at least one of the regions 16a, 16b (and preferably both regions 16a, 16b) of the band 12 is biased inward along the projection direction PD toward a central axis (designated by dashed line and labeled CA in FIG. 3) of the band 12. The central axis CA generally passes through the central region 17 of the band 12, and more preferably through the center of the housing 70 (through the surfaces 72a, 72b). More particularly, the central axis CA preferably passes through the center of a central, preferably planar, section 72a1 of the bottom surface 72a of the housing 70 and is preferably perpendicular to the central section 72a1. The central axis CA can, in certain embodiments, provide an axis of symmetry of the band 12.

As can most easily be seen in FIG. 3, the band 12 is generally curved, but has a varying degree of curvature along the circumference of the surface 14a of the band 12 such that the band 12 is increasingly curved in certain regions as compared with other regions of the band 12. Thus, the band 12 is preferably not an arc shape per se, but rather is preferably arcuate. The curvature of the of the surface 14a provides the surface 14a with a contour such that the regions 16a, 16b are biased inward toward the central axis CA along the projection direction PD. As a result, even if the engagement portions 80a, 80b are disengaged from each other (while the band 12 is positioned on (e.g., wrapped around) the portion of the animal), the acoustic concentrators 18a, 18b maintain penetration of the fur, and therefore are able to accurately convey vibration signals to the acoustic sensors 22a, 22b.

In addition, by biasing the regions 16a, 16b of the band 12 toward the central axis CA along the projection direction PD, the band 12 can be at least partially positioned on the portion of the animal, for example at least partially wrapped around the portion of the animal, so as to maintain at least a partial engagement on the animal. Accordingly, even if the engagement portions 80a, 80b become disengaged from each other, the band 12 can maintain at least a partial engagement on the animal (i.e., the band 12 can stay at least partially positioned on the portion of the animal).

It is noted that the acoustic concentrators on a given side of the band 12 have the same projection direction. Thus, for example, the acoustic concentrators 18a that are located on the left side 15a of the band 12 have a first common projection direction, and the acoustic concentrators 18b that are located on the right side 15b of the band 12 have a second common projection direction. The projection direction PD of the acoustic concentrators 18a, 18b can, in certain embodiments, be perpendicular to the portions of the surface 14a that are in the regions 16a, 16b. The portions of the surface 14a that are in the regions 16a, 16b can, in certain embodiments, be planar surfaces.

In general, the projection direction PD of the acoustic concentrators 18a, 18b forms an acute angle relative to the normal to a central section 72a1 of the bottom surface 72a of the housing 70. The acute angle is preferably in a range from 20° to 40°, and is more preferably closer to 30°. Since the projection direction PD of the acoustic concentrators 18a, 18b is also, in certain embodiments, perpendicular to the portions of the surface 14a that are in the regions 16a, 16b, the portions of the surface 14a that are in the regions 16a, 16b can themselves also form an acute angle relative to the normal to a central section 72a1 of the bottom surface 72a of the housing 70. This acute angle is preferably in a range from 45° to 65°, and is more preferably closer to 55°.

In certain embodiments, the band 12 is resiliently biased inward in (along) the projection direction PD such that even if the band 12 is flexed outward (i.e., the contact surface 14a is flexed away from the animal), the band 12 has a natural tendency to return to the initially biased (inwardly flexed) state. Various types of elastic materials can provide such biasing or resilient biasing, including, for example, polyurethane.

In certain embodiments, the housing 70 is dimensioned and structured to bias the regions 16a, 16b of the band 12 toward the central axis CA along the projection direction PD. As mentioned above when discussing the deployment locations of the temperature sensors 26a, 26b, the housing 70 includes a plurality of external surfaces, including bottom surface 72a, top surface 72b, and curved side surfaces 74a, 74b which form continuations of the top surface 72b on respective sides thereof.

Parenthetically, the attachment ends of the straps 11a, 11b are preferably attached at opposite sides of the housing 70 at or near the curved surfaces 74a, 74b.

The bottom surface 72a is located in the central region 17 and forms a portion of the inner surface 14a. The bottom surface 72a includes inwardly curved sections 72a2 and 72a3, and the central, preferably planar, section 72a1, which is disposed between the curved sections 72a2 and 72a3. The curved section 72a2 forms a part of the inner surface 14a on the side 15a, and the curved section 72a3 forms a part of the inner surface 14a on the side 15b. The two curved sections 72a2, 72a3 have curvature which provides the curved sections 72a2, 72a3 with a contour, and thus also provides the surface 14a with its contour. Preferably, the curved sections 72a2, 72a3 have the same amount curvature. The curved sections 72a2, 72a3 are preferably rigid, thereby providing a fixed amount of contour and curvature to the surface 14a.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system for monitoring an animal, comprising:
  a collar including:
    a band having a first surface for communicating with a portion of the animal and a second surface oppositely disposed from the first surface,
    at least one acoustic concentrator projecting from the first surface in a projection direction and configured to penetrate fur in the portion of the animal so as to place the band in communication with the portion of the animal,
    a sensor arrangement including:
      at least one acoustic sensor functionally associated with the at least one acoustic concentrator, at least one component of the at least one acoustic sensor embedded in the band, the at least one acoustic sensor operative to: i) measure at least one first bioparameter by detecting vibrations corresponding to the at least one first bioparameter, and ii) generate signals representing the at least one first bioparameter, and
      one or more non-acoustic sensors associated with the band and operative to: i) measure one or more second bioparameters associated with the animal, and ii) generate signals representing the one or more second bioparameters, and
    automatic gain control (AGC) circuitry in signal communication with the sensor arrangement and operative to adjust signal gain of the signals representing the at least one first bioparameter to maintain integrity of the signals representing the at least one first bioparameter generated by the at least one acoustic sensor, wherein the AGC circuitry is functionally associated with at least one of the one or more non-acoustic sensors and is configured to perform AGC function to adjust the signal gain of the signals representing the at least one first bioparameter based at least in part on the signals representing the one or more second bioparameters measured by the at least one of the one or more non-acoustic sensors; and
  a processing subsystem associated with the AGC circuitry configured to determine a condition of the animal based at least in part by processing signals received from the AGC circuitry.

2. The system of claim 1, wherein the at least one component of embedded in the band includes at least one piezoelectric element embedded in at least one region of the band associated with the at least one acoustic concentrator, and wherein the at least one region is biased toward a central axis of the band along the projection direction such that the at least one acoustic concentrator penetrates fur in the portion of the animal without necessitating engaging the collar when the band is positioned on the portion of the animal.

3. The system of claim 2, further comprising: a housing containing at least the AGC circuitry, the housing located in a central region of the band and being dimensioned so as to bias the at least one region.

4. The system of claim 1, wherein the processing subsystem is further configured to process signals associated with signals generated by the sensor arrangement to produce a metric indicative of whether the band is positioned on the portion of the animal.

5. The system of claim 4, wherein the one or more non-acoustic sensors includes at least a first temperature sensor that produces a first signal corresponding to a first temperature measurement and a second temperature sensor that produces a second signal corresponding to a second temperature measurement, the first temperature sensor located on a central region of the band and in association with the first surface of the band, and the second temperature sensor located on or near the central region of the band and in association with the second surface of the band, and wherein the processing subsystem produces the metric at least in part by processing the first and second signals to compare the first and second temperature measurements.

6. The system of claim 1, further comprising: a location module deployed in association with the band that provides location data indicative of a location of the band, wherein the processing subsystem is further configured to process signals associated with signals generated by the sensor arrangement together with the location data so as to produce correlated data that includes a correlation between location of the band and one or more of: vital signs of the animal, activity of the animal, movement of the animal, and posture of the animal.

7. The system of claim 6, wherein the location module includes one or more of: a global positioning system (GPS) receiver, a wireless communication transceiver, and a cellular communication transceiver.

8. The system of claim 1, wherein the processing subsystem is configured to determine the condition of the animal based further in part by processing signals received from the sensor arrangement including the signals representing the at least one second bioparameter.

9. The system of claim 1, wherein the at least one first bioparameter includes respiration rate and pulse rate.

10. The system of claim 1, wherein the one or more second bioparameters associated with the animal includes at least one of: skin or surface temperature of the animal, temperature of an immediate environment surrounding the animal, movement of the animal, and posture of the animal.

11. The system of claim 1, wherein the one or more non-acoustic sensors includes at least a first temperature sensor that produces a first signal corresponding to a first temperature measurement and a second temperature sensor that produces a second signal corresponding to a second temperature measurement, the first temperature sensor located on a central region of the band and in association with the first surface of the band, and the second temperature sensor located on or near the central region of the band and in association with the second surface of the band.

12. The system of claim 1, wherein the one or more non-acoustic sensors includes at least one of an accelerometer or a gyroscope.

13. The system of claim 1, wherein the processing subsystem is further configured to determine information associated with a condition of interest by processing signals associated with signals generated by the sensor arrangement together with data patterns derived from data collected from a control group of animals and data collected from a group of animals having the condition of interest.

14. The system of claim 1, wherein regions of the second surface that are at least partially behind the at least one acoustic concentrator are smooth regions.

15. The system of claim 1, wherein the collar further includes at least one of: i) at least one acoustic balancer projecting from the second surface and located at one or more regions of the second surface at least partially behind the at least one acoustic concentrator, the at least one acoustic balancer operative to reduce noise in vibrations conveyed by the at least one acoustic concentrator to the at least one acoustic sensor, or ii) a layer of compression resistive and energy absorptive material embedded in the band and located between the at least one acoustic sensor and the second surface of the band, the layer of compression resistive and energy absorptive material operative to reduce noise in vibrations conveyed by the at least one acoustic concentrator to the at least one acoustic sensor.

16. The system of claim 1, wherein for each respective signal of the signals representing the at least one first bioparameter, the AGC circuitry adjusts the gain of the respective signal by: i) checking the amplitude of the respective signal, ii) checking a saturation percentage of the respective signal that is indicative of a saturation level, and iii) adjusting a gain of an internal amplifier of the AGC circuitry based on the signals representing the one or more second bioparameters measured by the at least one of the one or more non-acoustic sensors such that the amplitude of the respective signal is below the saturation level.

* * * * *